(12) United States Patent
Thom

(10) Patent No.: US 10,773,434 B2
(45) Date of Patent: Sep. 15, 2020

(54) HOT RUNNER CO-INJECTION NOZZLE

(71) Applicant: MILACRON LLC, Cincinnati, OH (US)

(72) Inventor: Peter R. Thom, Sacramento, CA (US)

(73) Assignee: MILACRON LLC, Cincinnati, OH (US)

(*) Notice: Subject to any disclaimer, the term of this patent is extended or adjusted under 35 U.S.C. 154(b) by 145 days.

(21) Appl. No.: 16/090,741

(22) PCT Filed: Apr. 4, 2017

(86) PCT No.: PCT/US2017/025922
§ 371 (c)(1),
(2) Date: Oct. 2, 2018

(87) PCT Pub. No.: WO2017/176737
PCT Pub. Date: Oct. 12, 2017

(65) Prior Publication Data
US 2019/0111598 A1   Apr. 18, 2019

Related U.S. Application Data

(60) Provisional application No. 62/318,155, filed on Apr. 4, 2016.

(51) Int. Cl.
*B29C 45/16*   (2006.01)
*B29C 45/27*   (2006.01)
(Continued)

(52) U.S. Cl.
CPC .......... *B29C 45/1603* (2013.01); *B29C 39/22* (2013.01); *B29C 41/34* (2013.01);
(Continued)

(58) Field of Classification Search
CPC ......... B29C 39/22; B29C 41/34; B29C 41/36; B29C 45/2725; B29C 45/2737;
(Continued)

(56) References Cited

U.S. PATENT DOCUMENTS 3,947,177 A * 3/1976 Eckardt ............... B29C 44/0492
425/130
4,052,497 A * 10/1977 Monnet ............... B29C 45/1604
264/255

(Continued)

FOREIGN PATENT DOCUMENTS

CN   104441489 A   3/2015

OTHER PUBLICATIONS

International Search Report and Written Opinion dated Jun. 20, 2017 in corresponding International Patent Application No. PCT/US2017/025922.

*Primary Examiner* — Xiao S Zhao
*Assistant Examiner* — Emmanuel S Luk
(74) *Attorney, Agent, or Firm* — Medler Ferro Woodhouse & Mills PLLC

(57) ABSTRACT

A co-injection nozzle is disclosed that includes a combining means configured to reduce shear heating and create a more even shear heating profile in core and skin material flow streams. The combining means is configured to reduce shear heating peaks and valleys in core and skin material flow streams as the streams flow between annular channels of the combining means during a mold filling process.

20 Claims, 21 Drawing Sheets

(51) Int. Cl.
    *B29C 41/36*     (2006.01)
    *B29C 41/34*     (2006.01)
    *B29C 39/22*     (2006.01)
    *B29C 45/30*     (2006.01)

(52) U.S. Cl.
    CPC ............ *B29C 41/36* (2013.01); *B29C 45/278* (2013.01); *B29C 45/2725* (2013.01); *B29C 45/2737* (2013.01); *B29C 45/1607* (2013.01); *B29C 2045/1609* (2013.01); *B29C 2045/1614* (2013.01); *B29C 2045/308* (2013.01)

(58) Field of Classification Search
    CPC .............. B29C 45/278; B29C 45/1607; B29C 45/1603; B29C 2045/1614; B29C 2045/308; B29C 2045/1609
    See application file for complete search history.

(56) References Cited

U.S. PATENT DOCUMENTS

| | | | | |
|---|---|---|---|---|
| 4,315,724 A * | 2/1982 | Taoka | ..................... | B29C 45/16 |
| | | | | 264/245 |
| 4,934,915 A * | 6/1990 | Kudert | ................ | B29C 45/1607 |
| | | | | 425/132 |
| 5,094,603 A * | 3/1992 | Gellert | ................ | B29C 45/1603 |
| | | | | 264/328.15 |
| 5,783,234 A * | 7/1998 | Teng | .................. | B29C 45/2806 |
| | | | | 425/549 |
| 5,935,615 A * | 8/1999 | Gellert | ................ | B29C 45/1603 |
| | | | | 425/130 |
| 6,030,198 A * | 2/2000 | Babin | ................. | B29C 45/1607 |
| | | | | 425/130 |
| 6,135,751 A * | 10/2000 | Gellert | ................ | B29C 45/1607 |
| | | | | 425/130 |
| 6,245,278 B1 * | 6/2001 | Lausenhammer | ...... | B29C 45/27 |
| | | | | 264/328.1 |
| 6,349,886 B1 * | 2/2002 | Bouti | .................. | B29C 45/1603 |
| | | | | 239/11 |
| 6,524,089 B1 * | 2/2003 | Nightingale | ........ | B29C 45/1603 |
| | | | | 264/513 |
| 6,524,093 B2 * | 2/2003 | Bouti | .................. | B29C 45/2806 |
| | | | | 425/549 |
| 6,679,697 B2 * | 1/2004 | Bouti | .................. | B29C 45/2806 |
| | | | | 425/130 |
| 7,527,490 B2 * | 5/2009 | Fairy | .................. | B29C 45/1603 |
| | | | | 425/130 |
| 9,498,911 B2 * | 11/2016 | Babin | ................. | B29C 45/1603 |
| 2001/0026819 A1 * | 10/2001 | Gould | ..................... | B29C 45/30 |
| | | | | 425/572 |
| 2002/0105113 A1 * | 8/2002 | Wright | ..................... | B29C 45/30 |
| | | | | 264/349 |
| 2003/0209833 A1 * | 11/2003 | Bemis | ................. | B29C 45/1603 |
| | | | | 264/328.8 |
| 2004/0247739 A1 | 12/2004 | Sabin et al. | | |
| 2012/0070532 A1 | 3/2012 | Ten et al. | | |
| 2013/0207289 A1 * | 8/2013 | Babin | ................. | B29C 45/1684 |
| | | | | 264/40.1 |
| 2016/0114505 A1 * | 4/2016 | Toyoda | ................... | B29B 11/08 |
| | | | | 425/568 |
| 2017/0312961 A1 * | 11/2017 | Muhlemann | .......... | B29C 45/231 |
| 2017/0320248 A1 * | 11/2017 | Muhlemann | ........ | B29C 45/1604 |
| 2019/0275717 A1 * | 9/2019 | Yankov | .................. | B29C 45/278 |
| 2019/0389109 A1 * | 12/2019 | Bouti | ..................... | B29B 11/08 |
| 2020/0070393 A1 * | 3/2020 | Lin | ....................... | B29C 45/278 |

\* cited by examiner

HOT RUNNER CO-INJECTION NOZZLE

CROSS-REFERENCE TO RELATED APPLICATION

The present application claims the benefit of prior U.S. Appl. No. 62/318,155, filed Apr. 4, 2016, which is incorporated by reference herein in its entirety.

BACKGROUND OF THE INVENTION

In a co-injection molding application when a melt stream of core material and a melt stream of skin material are subjected to the high flowrates required to fill a mold for producing a large part in a short period of time, such as filling a mold for forming a 1 kg pail in 1.5 seconds, a hot runner co-injection nozzle may generate high levels of shear heating as well as localized shear heating peaks in multiple areas of an annular flow melt stream thereof. These shear peaks are inherent to the nature of annular flow geometry, and as is known may be resolved by reducing fill flowrate. However when a faster cycle time is desired, reducing a fill flow rate is not a viable solution. What is needed is a co-injection nozzle that reduces shear heating and creates a more even shear heating profile, thereby reducing shear heating peaks and valleys in core and skin material flow streams during a mold filling process having a faster cycle time.

SUMMARY OF THE INVENTION

Embodiments hereof are directed to a co-injection nozzle having a combining component for balancing or equalizing shear-induced heat in each of a first melt stream of moldable material and a second melt stream of moldable material that flow through the nozzle. The combining component may include an inner part with a first port for receiving the first melt stream from a first melt source and a second port for receiving the second melt stream from a second melt source, a middle subcomponent that defines an inside annular channel between a middle sleeve and a middle shell thereof, and an outer subcomponent that defines an inside annular channel between an outer sleeve and an outer shell thereof. The combining component may be configured such that the first melt stream is received within the inside annular channel of the middle subcomponent and flows downstream therefrom through a plurality of apertures in a sidewall of the middle shell and into a plurality of angled grooves in an outer surface of the sidewall of the middle shell, and such that the second melt stream is received within the inside annular channel of the outer subcomponent and flows downstream therefrom through a plurality of apertures in a sidewall of the outer shell and into a plurality of angled grooves in an outer surface of the sidewall of the outer shell.

Embodiments hereof are directed to a co-injection nozzle having a combining component for balancing or equalizing shear-induced heat in each of a first melt stream of moldable material and a second melt stream of moldable material that flow through the nozzle. The combining component may include a first subcomponent that defines a first inside annular channel between a first sleeve and a first shell thereof, the first shell having a plurality of apertures in a sidewall thereof and a plurality of angled grooves in an outer surface of the sidewall thereof, and a second subcomponent that defines a second inside annular channel between a second sleeve and a second shell thereof, the second shell having a plurality of apertures in a sidewall thereof and a plurality of angled grooves in an outer surface of the sidewall thereof. The combining component may be configured such that the first melt stream is received within the first inside annular channel of the first subcomponent and flows downstream therefrom through the plurality of apertures and the plurality of angled grooves of the first shell, and such that the second melt stream is received within the second inside annular channel of the second subcomponent and flows downstream therefrom through the plurality of apertures and the plurality of angled grooves of the second shell.

BRIEF DESCRIPTION OF DRAWINGS

Features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of embodiments hereof is in the context of molding a large co-injected part, the invention may also be used in any other molding application where it is deemed useful. Furthermore, there is no intention to be bound by any expressed or implied theory presented in the preceding technical field, background, brief summary or the following detailed description.

In a co-injection molding application when a melt stream of core material and a melt stream of skin material are subjected to the high flowrates required to fill a mold for producing a large part in a short period of time, such as filling a mold for forming a 1 kg pail in 1.5 seconds, a hot runner co-injection nozzle may generate high levels of shear heating as well as localized shear heating peaks in multiple areas of an annular flow melt stream thereof. These shear peaks are inherent to the nature of annular flow geometry, and as is known may be resolved by reducing fill flowrate. However when a faster cycle time is desired, reducing a fill flow rate is not a viable solution. In embodiments hereof, a co-injection nozzle is configured to reduce shear heating and create a more even shear heating profile, thereby reducing shear heating peaks and valleys in core and skin material flow streams that flow through the annular channels of the nozzle during a mold filling process. In this manner, a better multi-layer molded article may be produced by co-injection nozzles made in accordance with embodiments hereof.

Figure 1:
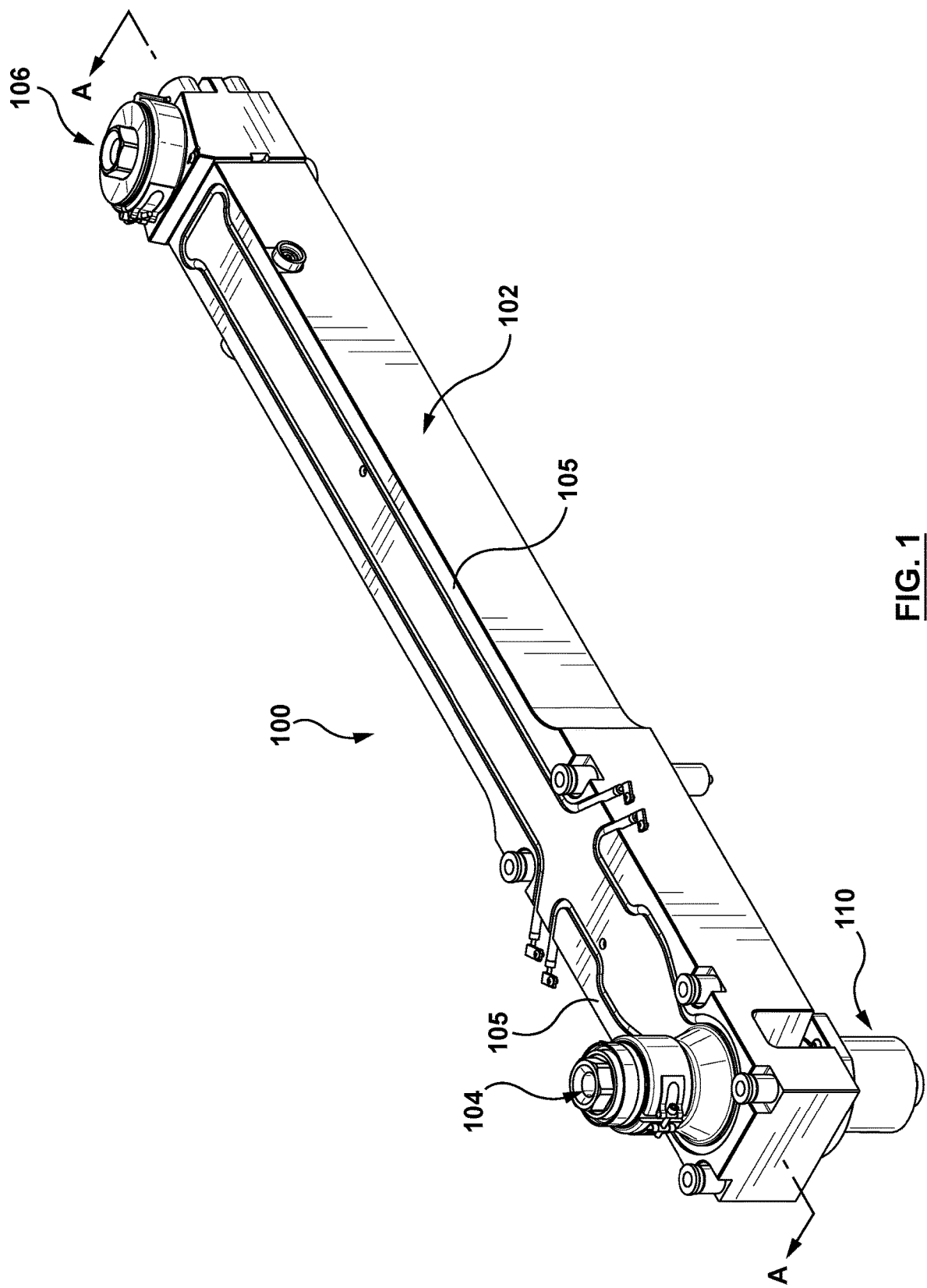
FIG. 1 is a hot runner co-injection assembly in accordance with an embodiment hereof.

FIG. 1 is a perspective view of a hot runner co-injection assembly 100 in accordance with an embodiment hereof. The co-injection assembly 100 includes a hot runner co-injection manifold 102 having a first inlet 104 for receiving a melt stream of a first moldable material from an injection nozzle (not shown) of an injection molding machine (not shown) and having a second inlet 106 for receiving a melt stream of a second moldable material from an injection nozzle (not shown) of the injection molding machine (not shown), or in an embodiment from an injection nozzle of an auxiliary injection molding unit (not shown). The first moldable material may be referred to as a skin material for forming inner and outer layers of a molded article, and the second moldable material may be referred to as a core material for forming a middle, interior or core layer of the multi-layer molded article. A heater 105 is shown joined to a surface of the manifold and may be of any other suitable heater configuration known to one of skill in the art.

Figure 1A:
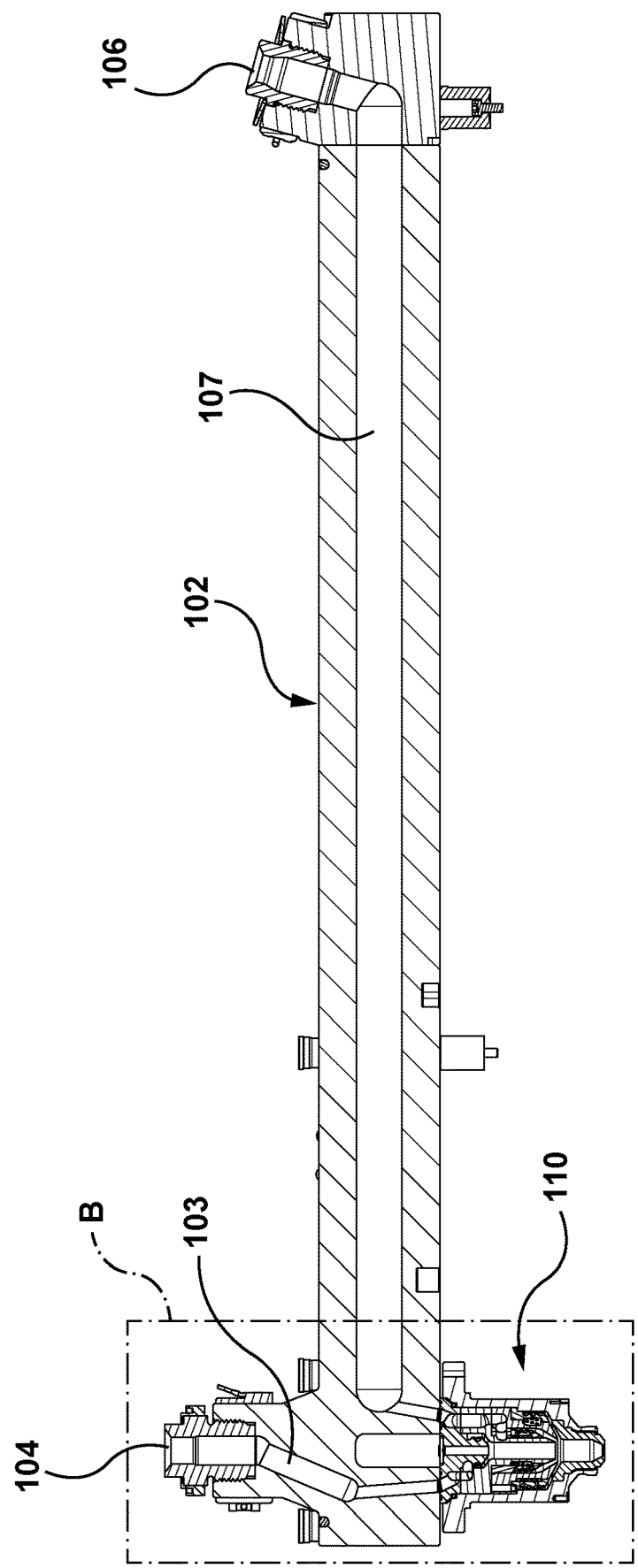
FIG. 1A is a sectional view of the co-injection assembly of FIG. 1 taken along line A-A thereof.
Figure 1B:
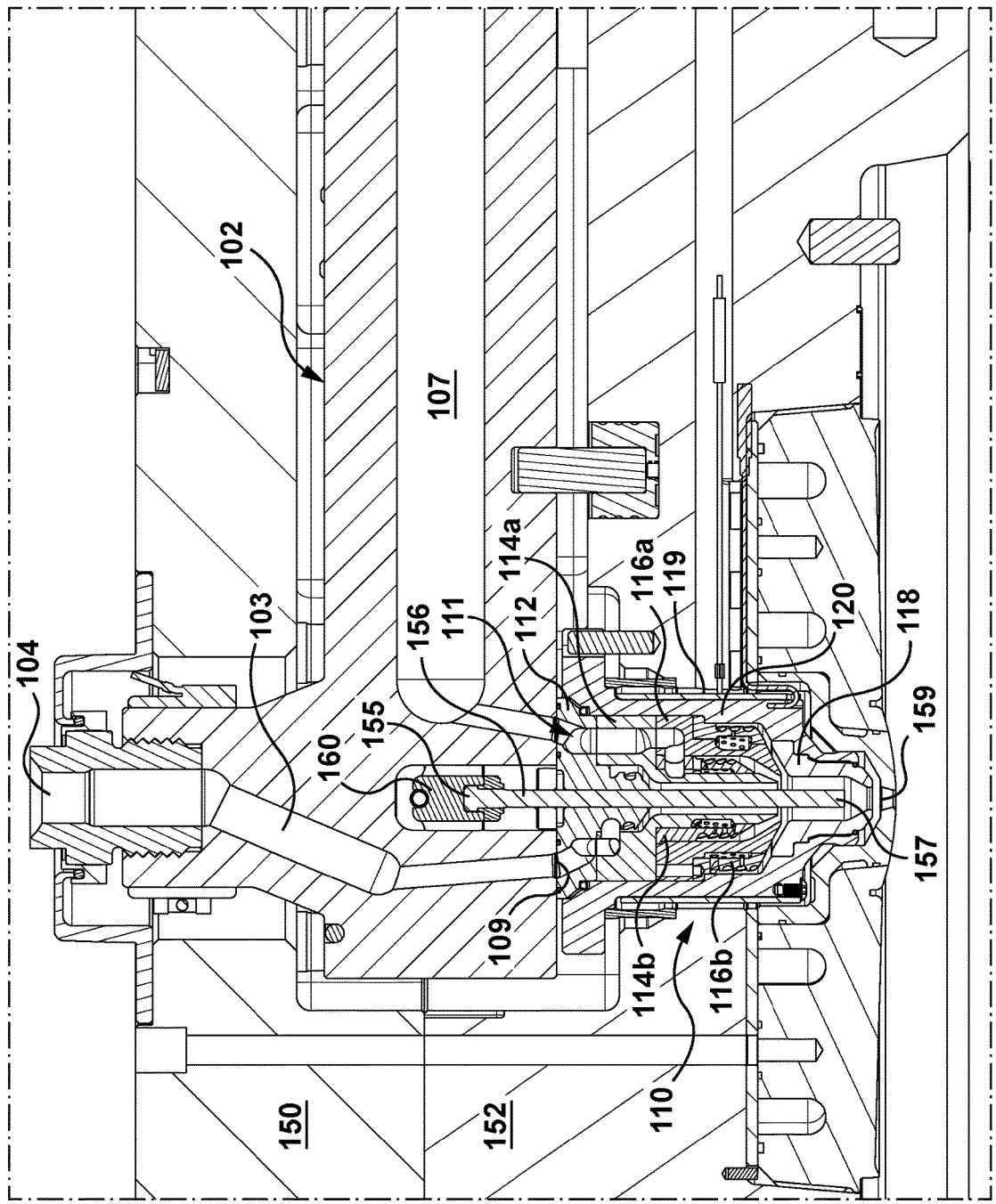
FIG. 1B is an enlarged view of an area B of FIG. 1A.

A hot runner co-injection nozzle 110 in accordance with an embodiment hereof is shown attached to the manifold 102 opposite of the first inlet 104. FIG. 1A is a sectional view of the co-injection assembly 100 taken along line A-A of FIG. 1, and FIG. 1B is an enlarged view of an area B of FIG. 1A. FIG. 1B depicts various mold plates 150, 152 spaced from and surrounding manifold 102 and depicts a valve pin 156 that are not shown in FIG. 1A for ease of illustration. A first melt channel 103 of the manifold 102 extends from the first inlet 104 to the co-injection nozzle 110 to be in fluid communication with a first inlet 109 of the nozzle 110 for distributing a skin material thereto for forming the inner and outer layers of the molded article. A second melt channel 107 of the manifold 102 extends from the second inlet 106 to the co-injection nozzle 110 to be in fluid communication with a second inlet 111 of the nozzle 110 for distributing a core material thereto for forming the middle layer of the molded article. As would be understood by one of skill in the art, the valve pin 156 has a first end 155 attached to an actuator 160 and a second end 157 for mating with and closing a mold gate 159. The valve pin 156 is not shown in the remaining figures for ease of illustration. Although a single manifold is shown for distributing the two melt streams to the co-injection nozzle 110, in other embodiments two or more manifold may be adapted for use in accordance herewith.

Figure 2A:
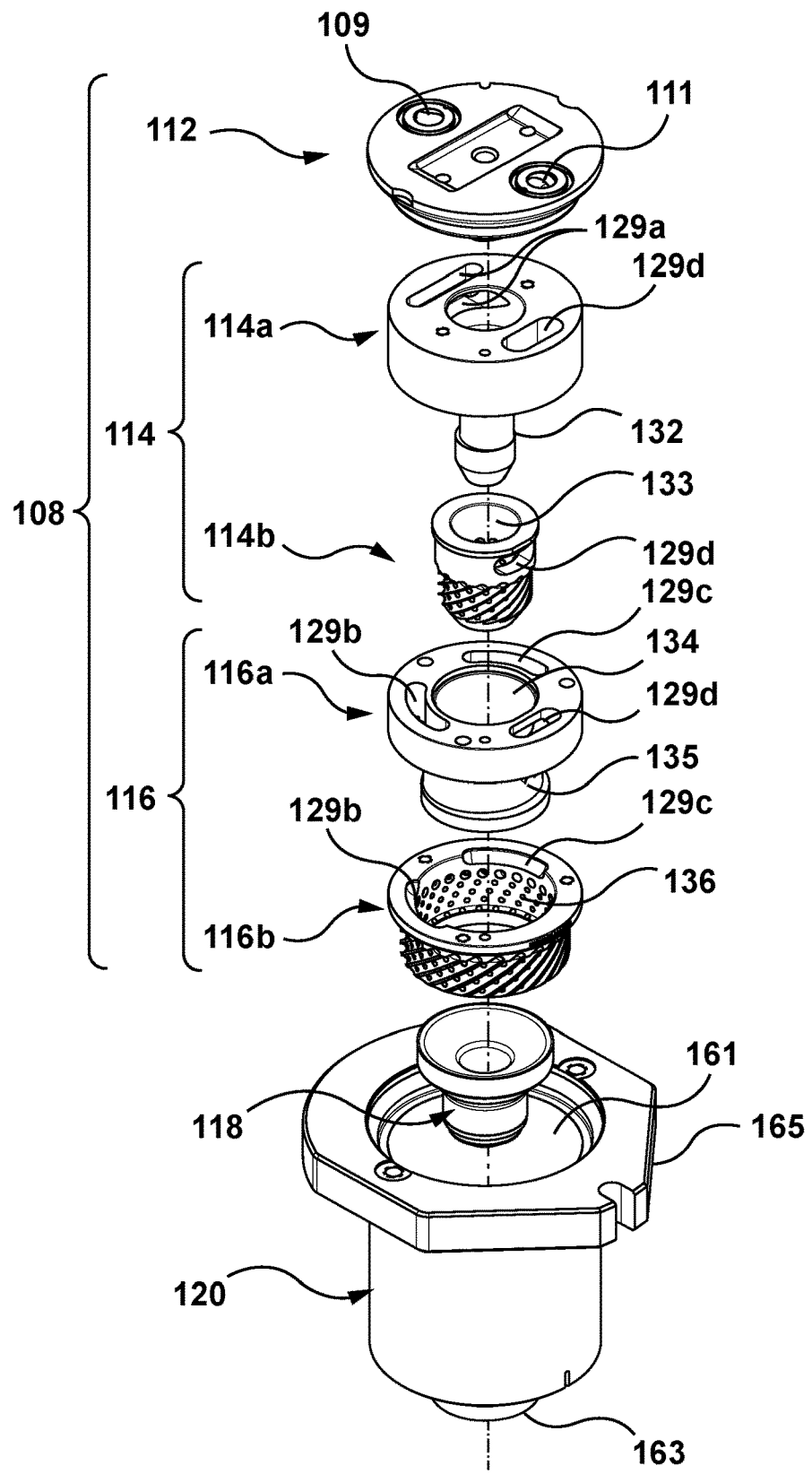
FIGS. 2A and 2B depict exploded views of a hot runner co-injection nozzle in accordance with an embodiment hereof, with FIG. 2A being a perspective view showing an upstream end of the nozzle parts and with FIG. 2B being a perspective view showing a downstream end of the nozzle parts.
Figure 2B:
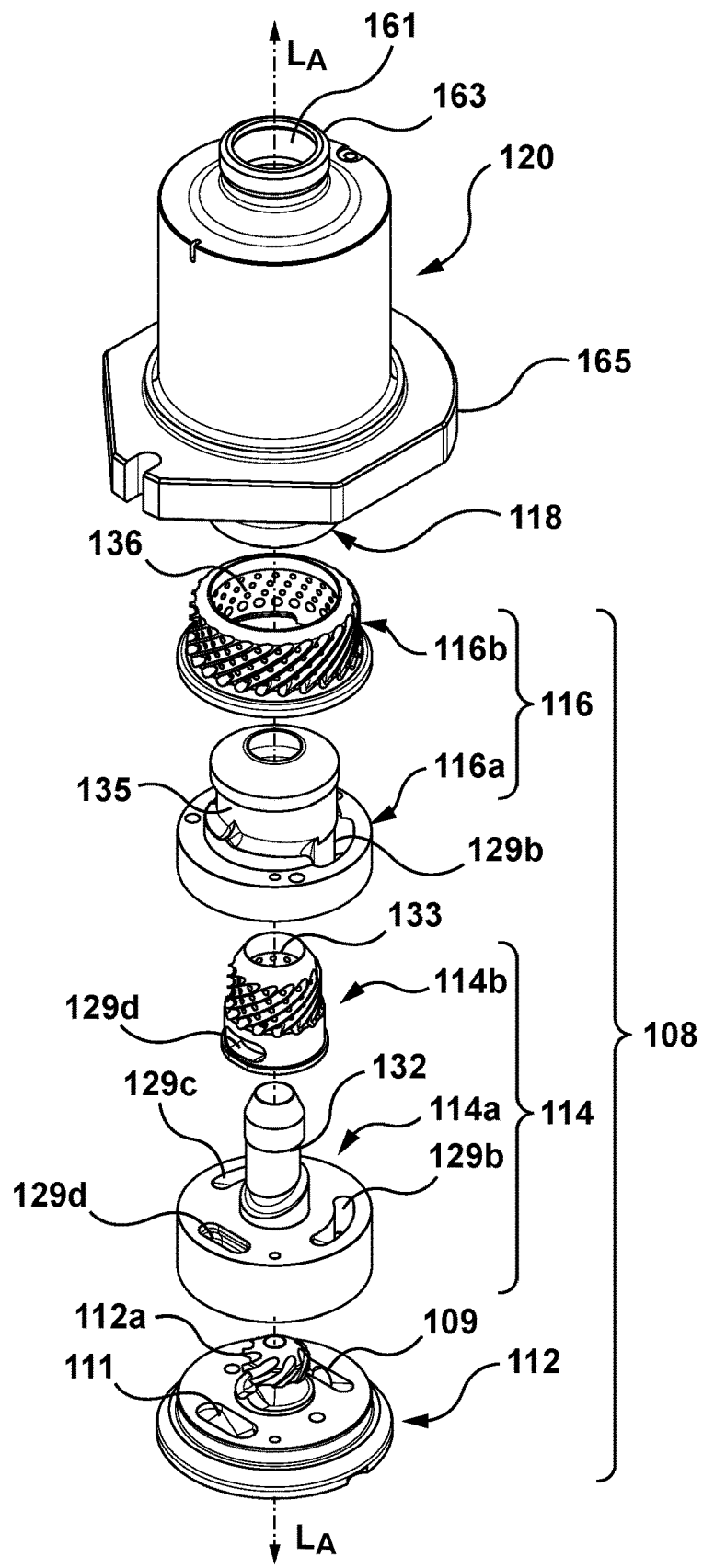
Figure 5:
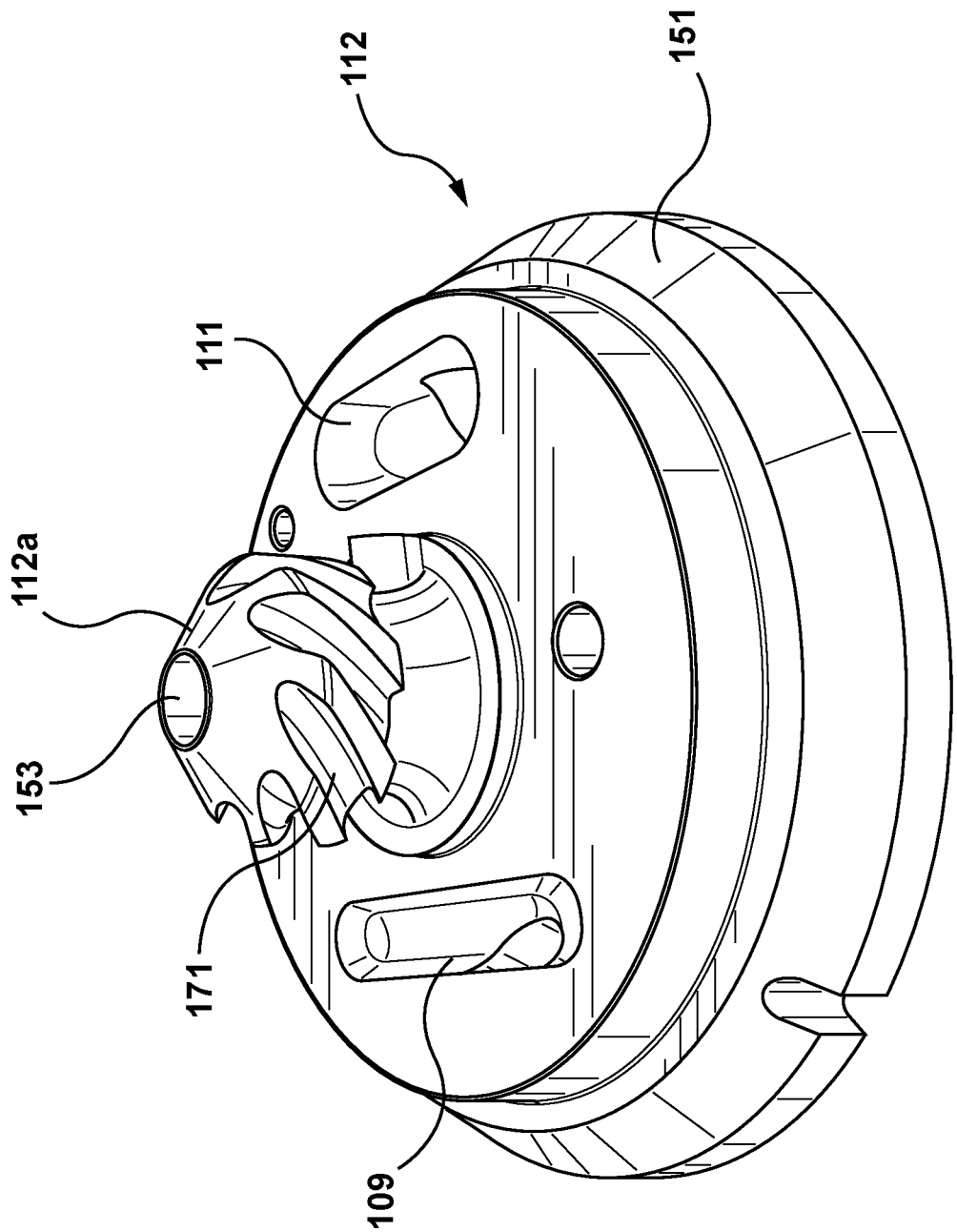
FIG. 5 is a perspective view of a downstream end of an inner means of a combining means in accordance with an embodiment hereof.

FIGS. 2A and 2B depict exploded views of the hot runner co-injection nozzle 110 in accordance with an embodiment hereof, with FIG. 2A being a perspective view showing an upstream end of the nozzle parts of the nozzle 110 and with FIG. 2B being a perspective view showing a downstream end of the nozzle parts of the nozzle 110. With reference to FIGS. 1B, 2A and 2B, the co-injection nozzle 110 includes a nozzle tip or insert 118, a nozzle body 120 and a combining means or combining component 108. In an embodiment hereof, the nozzle body 120 may be machined from H13 steel, though other tool steels would also be suitable, and the nozzle tip/insert 118 may be machined from a high-thermal conductivity grade of beryllium copper, though other high conductivity copper alloys, such as C18000 would also be suitable. The nozzle body 120 is a tubular part that defines a central bore 161 therethrough that is sized at a downstream end 163 of the nozzle body 120 to receive and engage with the nozzle tip 118 and is sized at an upstream end 165 of the nozzle body 120 to receive and engage with the combining component 108. As shown in FIG. 1B, by way of example and not limitation, a sleeve heater 119 is configured to surround and contact the nozzle body 120 for providing heating thereof to maintain the melt streams of moldable material at a suitable processing temperature. The combining component 108 comprises an inner means or part 112, a middle means or middle subcomponent 114 and an outer means or outer subcomponent 116. The inner means 112 includes an upstream flange portion 151, and a valve pin support 112a defining a central bore 153 for receiving a valve pin therethrough and having a series of grooves 171 formed in an outer surface thereof, as shown in FIG. 5. In embodiments hereof, the middle subcomponent 114 of the combining component 108 includes a middle sleeve 114a and a middle shell 114b and the outer subcomponent 116 of the combining component 108 includes an outer sleeve 116a and an outer shell 116b.

Figure 8:
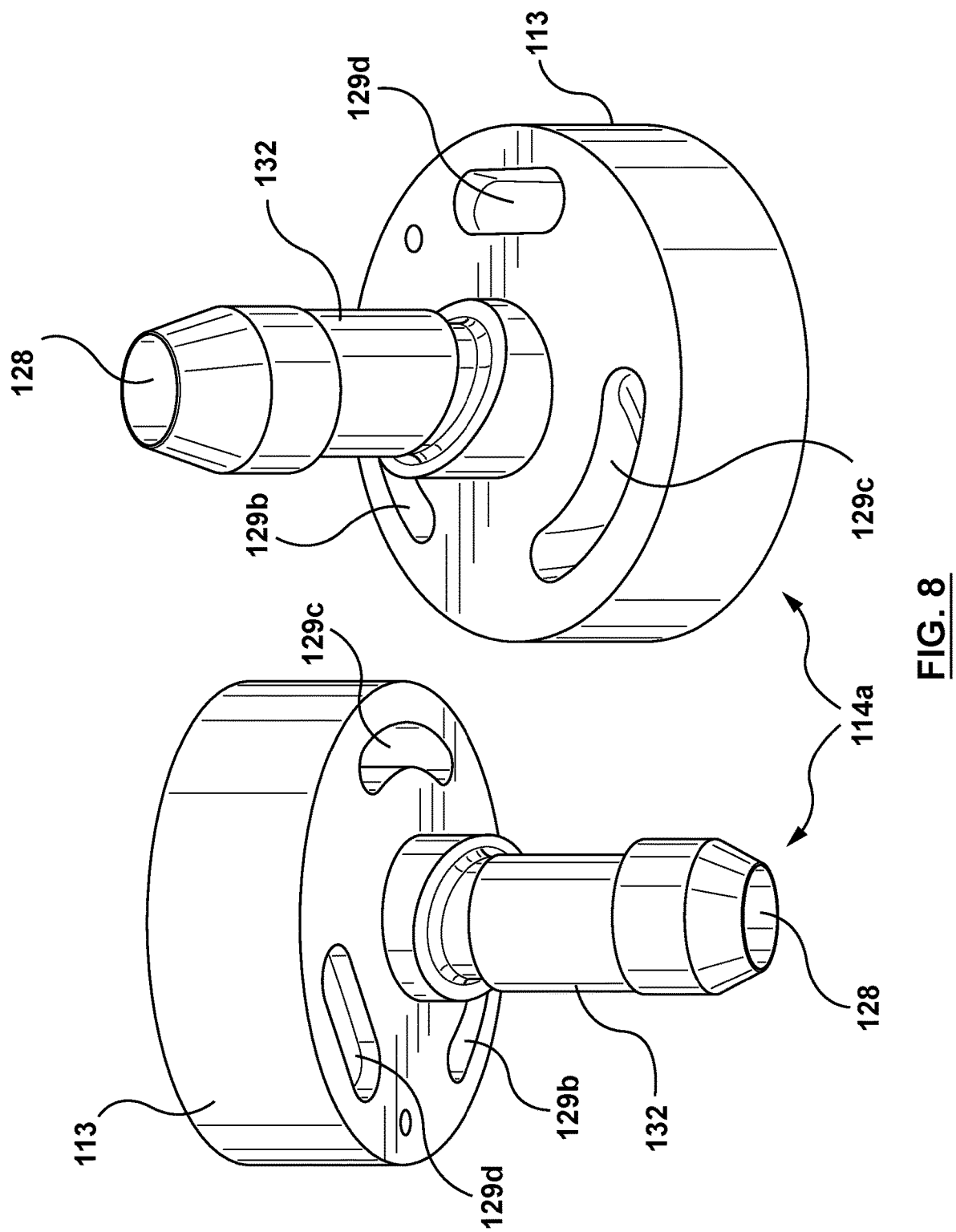
FIG. 8 depicts perspective side views of a middle sleeve part of a combining means in accordance with an embodiment hereof.

With reference to FIG. 8, the middle sleeve 114a of the middle subcomponent 114 is a machined part having an upstream end or flange 113 and a tubular extension 132. In an embodiment, a middle sleeve 114a may be machined from H13 steel, though other tool steels would also be suitable. A central channel 128 is defined through the upstream flange 113 and the tubular extension 132 to extend a length of the middle sleeve 114a. The central channel 128 of the middle sleeve 114a is configured to receive and translate a melt stream of a moldable material for forming an inner layer of a multi-layer molded article, such as a melt stream flowing along flow path 122 described below. The central channel 128 of the middle sleeve 114a is also configured to receive a valve pin (not shown) therein. The tubular extension 132 is configured to be received within a central bore 133 of the middle shell 114b with an outer surface of the tubular extension 132 forming an inner wall of an inside annular channel 130e, as described below, to translate a melt stream of a moldable material for forming a middle or interior layer of a multi-layer molded article, such as a melt stream flowing along flow path 126 described below.

Figures 12A, 12B:
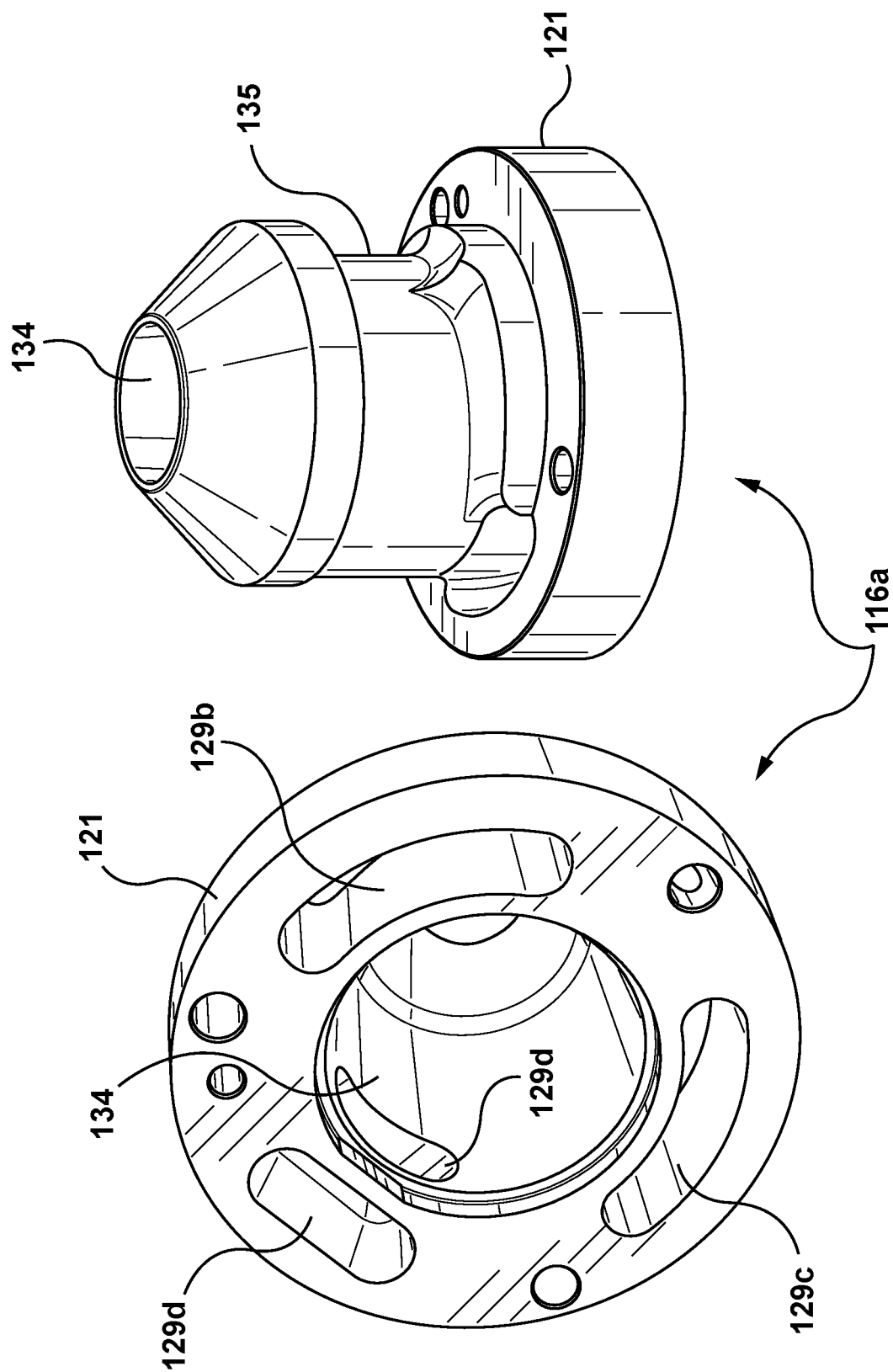
FIG. 12A is a perspective upstream end view and FIG. 12B is a perspective side view of an outer sleeve part of a combining means in accordance with an embodiment hereof.

With reference to FIGS. 12A and 12B, the outer sleeve 116a of the outer subcomponent 116 is a machined part having an upstream end or flange 121 and a tubular extension 135. In an embodiment, an outer sleeve 116a may be machined from H13 steel, though other tool steels would also be suitable. A central bore or lumen 134 is defined through the upstream flange 121 and the tubular extension 135 to extend a length of the outer sleeve 116a. The central bore 134 of the outer sleeve 116a is configured to receive the middle component 114, and particularly the middle shell 114b, therein. The central bore 134 of the outer sleeve 116a also forms an outer wall of an outside annular channel 130d, as described below, to translate a melt stream of a moldable material for forming a middle or interior layer of a multi-layer molded article, such as a melt stream flowing along flow path 126 described below.

Figure 7:
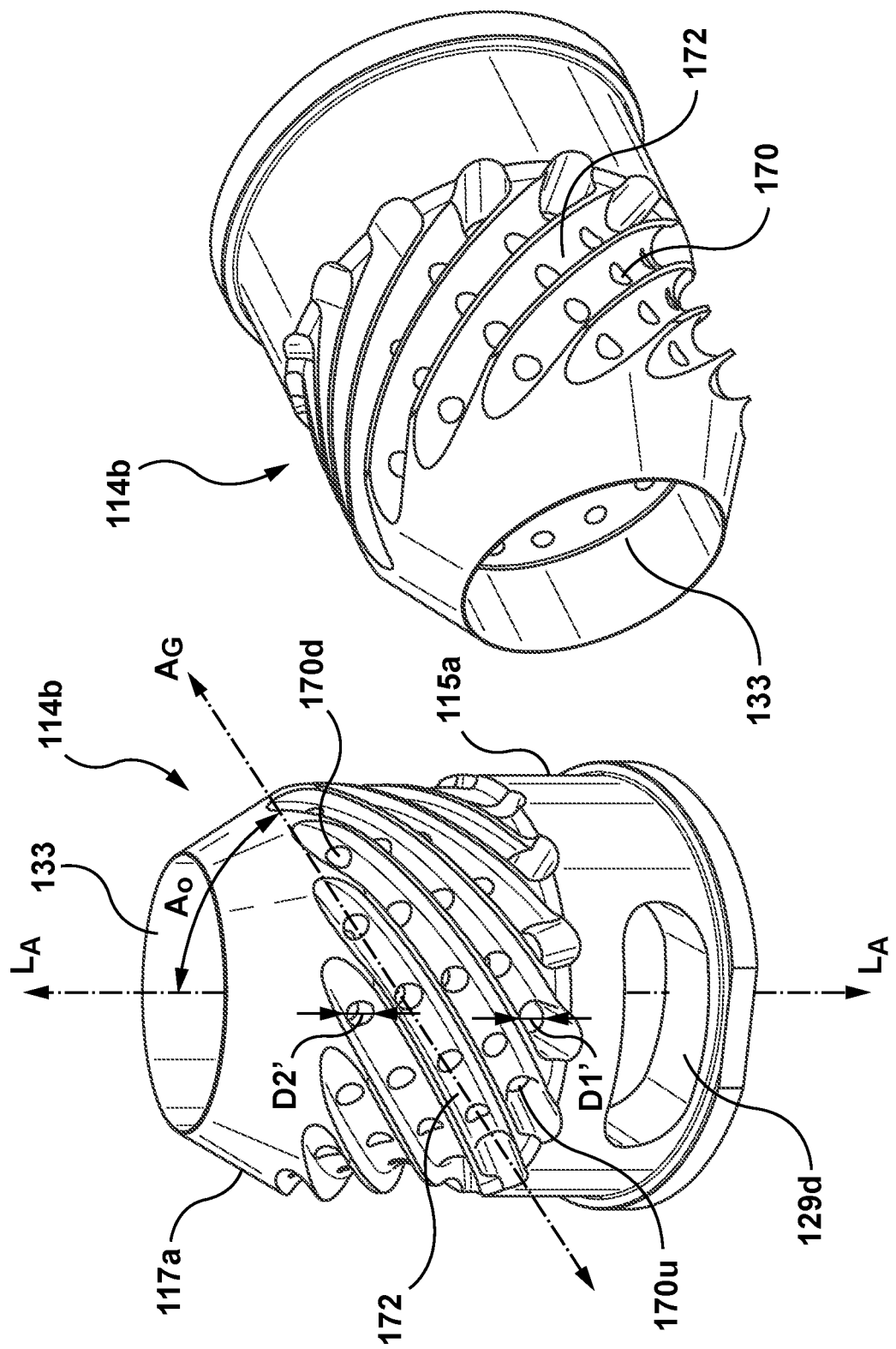
FIG. 7A is a perspective side view and FIG. 7B is a perspective downstream end view of a middle shell part of a combining means in accordance with an embodiment hereof.
Figure 10:
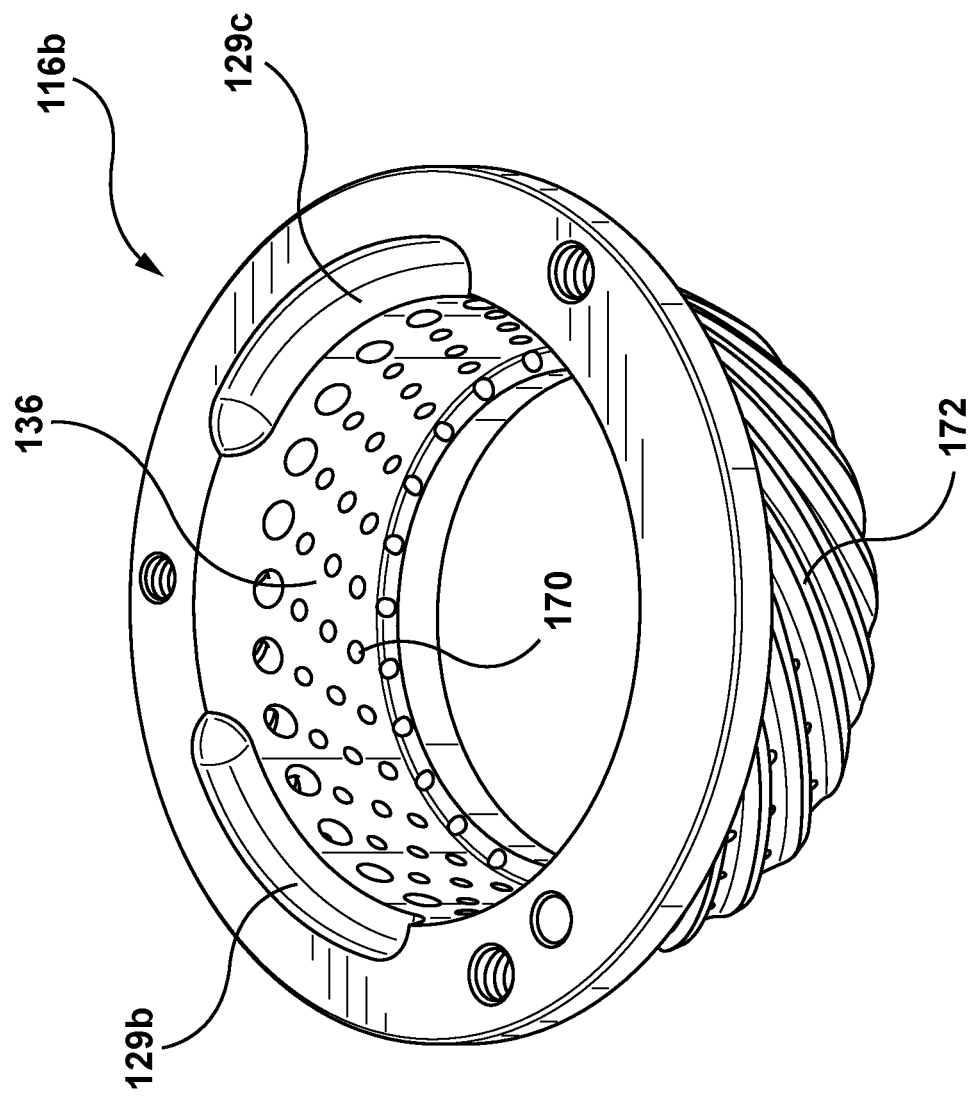
FIG. 10 is a perspective view of an upstream end of an outer shell part of a combining means in accordance with an embodiment hereof.
Figure 11:
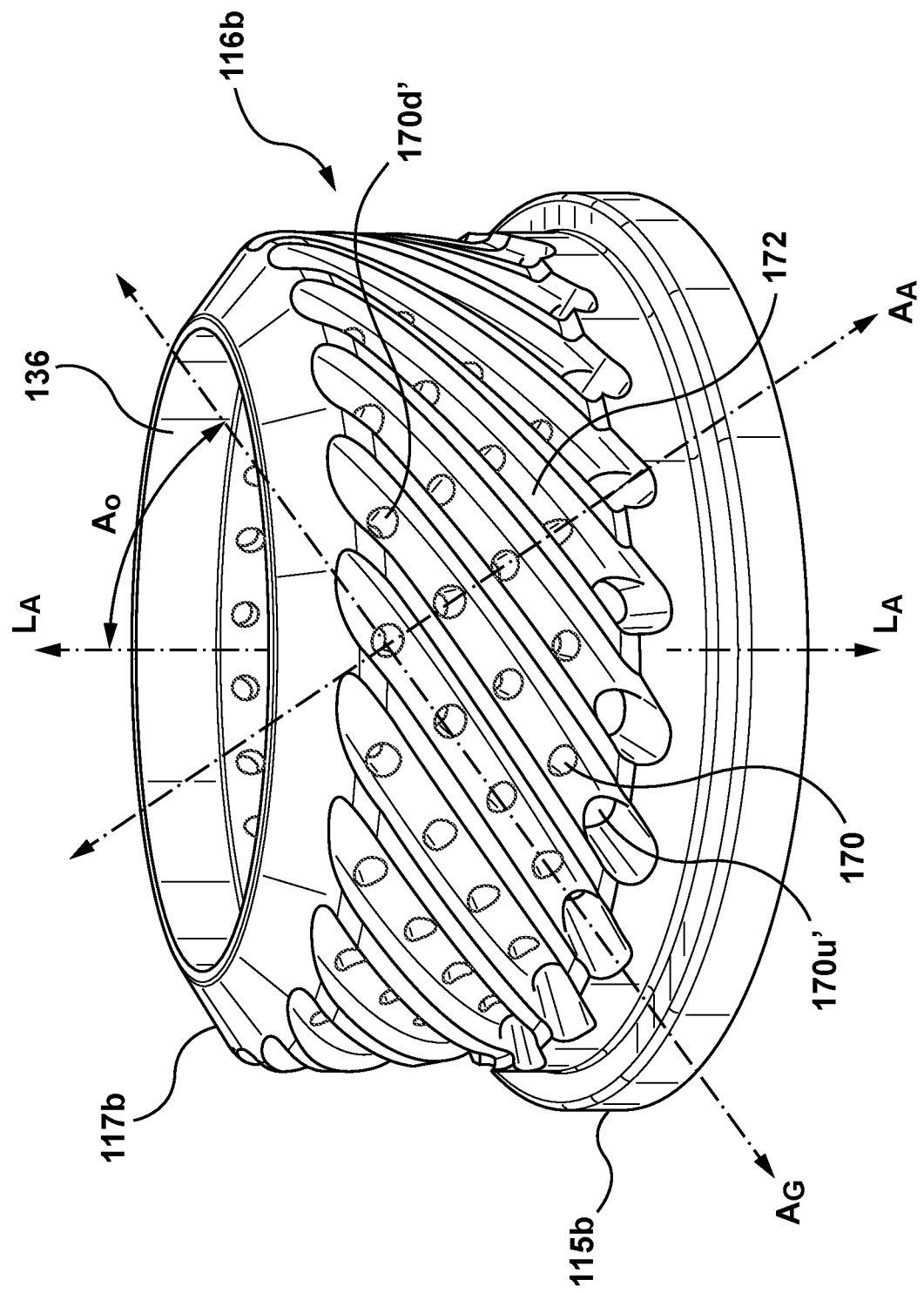
FIG. 11 is a perspective side view of an outer shell part of a combining means in accordance with an embodiment hereof.

Each of the middle shell 114b and the outer shell 116b is a substantially tubular structure that includes a plurality of bores, holes or apertures 170 (see FIGS. 7A, 7B, 8A and 9-11) through a sidewall thereof that are arranged to access a series of angled grooves 172 formed in an outer surface of the respective sidewall thereof. In an embodiment, a middle shell 114b and outer shell 116b may be machined from H13 steel, though other tool steels would also be suitable. The series of angled grooves 172 are arranged side-by-side about the circumference (outer surface) of the respective shell. With reference to FIGS. 7A and 11, each groove 172 extends from proximate to an upstream portion 115a, 115b, respectively, to substantially a downstream portion 117a, 117b, respectively, of the respective middle or outer shell 114b, 116b, at an angle $A_O$ to a longitudinal axis $L_A$ of the respective shell, so as to partially wrap about the circumference (outer surface) of the respective shell. Stated another way, and with reference to FIGS. 7A and 11, an upstream aperture 170u, 170u' and a downstream aperture 170d, 170d' of a respective groove 172 are not aligned with each other along an axis that is parallel to the longitudinal axis $L_A$ of the respective middle or outer shell 114b, 116b, but instead are circumferentially spaced from each other along a respective groove axis $A_G$ that is at an angle $A_O$ to the longitudinal axis $L_A$. Also with reference to FIG. 11, the apertures 170 in adjacent grooves 172 are spaced and aligned with respect to an axis $A_A$ in such a way as to maximize the efficacy of the grooves 172 in spreading any shear peaks of a melt stream flowing in an inside annular channel, with respect to a middle shell 114b or an outer shell 116b, circumferentially around an outside annular channel, with respect to a middle shell 114b or an outer shell 116b, so that any shear peaks of a melt stream are not concentrated in one location, as in known designs, but rather distributed by a combination of apertures 170 and their respective grooves 172. While a melt stream flows in an inside annular channel between a respective sleeve and shell (before flowing through apertures), the melt stream flows substantially parallel to longitudinal axis $L_A$. When a shear peak in this melt stream flow intersects an aperture, a portion of it is directed through the aperture. The "backwards" or negative angle of the axis $A_A$ with respect to the axes $A_G$ and $L_A$ helps to ensure that as a melt stream is directed through the various apertures, the melt stream ends up flowing in as many different grooves as possible, rather than through multiple apertures into the same groove. In embodiments hereof, such an arrangement of apertures and grooves may maximize the efficacy of "spreading" the shear peaks in a melt stream around the circumference of the respective shell in the respective outside annular channel.

Figure 8A:
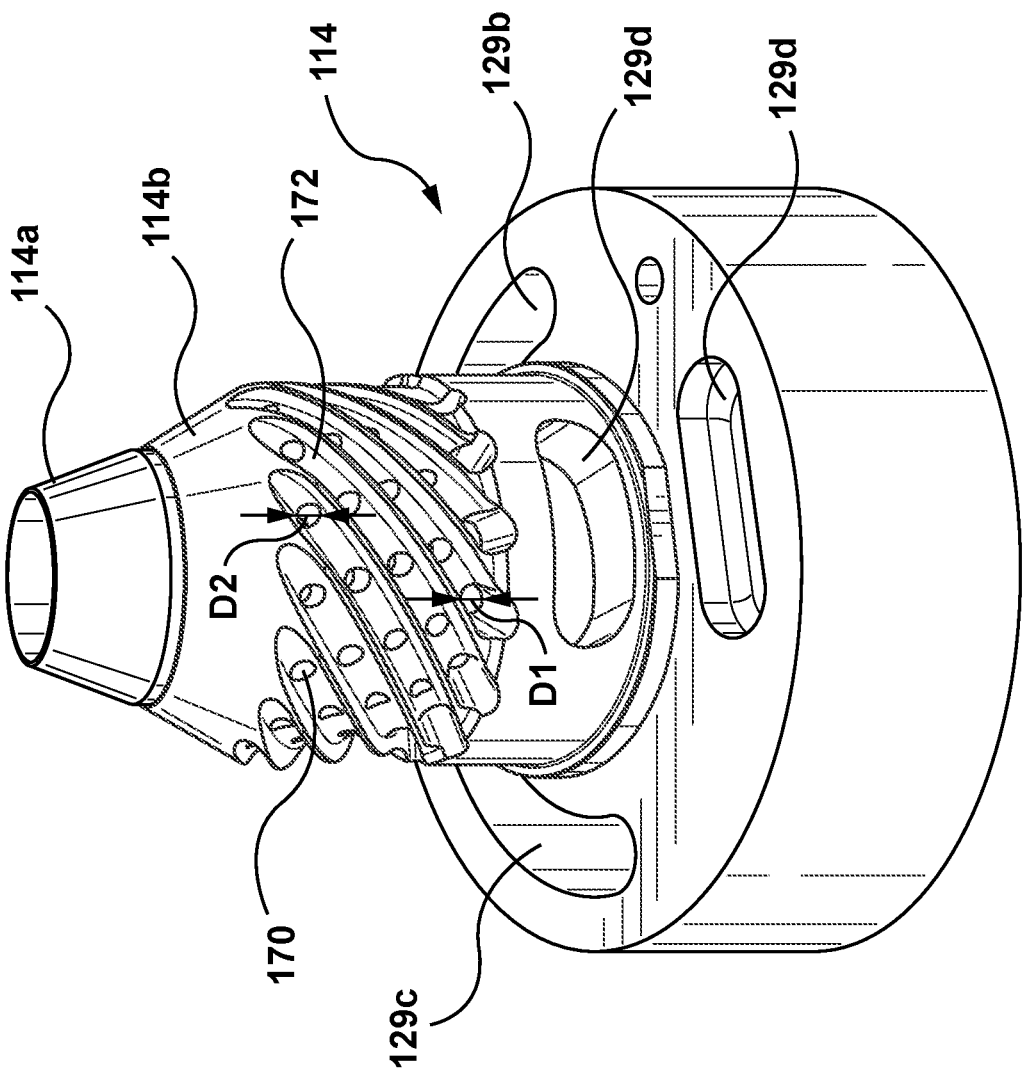
FIG. 8A depicts a perspective side view of a middle sleeve part and a middle shell part combined in accordance with an embodiment hereof.

Each upstream aperture (such as apertures 170u, 170u' in FIGS. 7A and 11) of a circumferential spacing of apertures 170, which form a first upstream row of apertures 170 proximate the upstream portions 115a, 115b of each of the middle shell 114b and the outer shell 116b, has a larger diameter D1, D1' than a diameter D2, D2' of a remainder of the apertures 170 that are located downstream of the first upstream row, as depicted in FIGS. 7A and 8A. The larger diameter D1, D1' apertures 170 in the first upstream row of each shell are provided to allow a greater amount of flow of a skin or core material there through in order to introduce/create flow in a first, upstream end of a corresponding groove 172 in the outer surface of the middle shell 114b/outer shell 116b. By establishing flow in upstream ends of the grooves, potential areas of slow flow/stagnation in the melt stream in an upstream end of an inside annular channel and the melt stream in an upstream end of an outside annular channel (near the upstream ends of the grooves) may be reduced, since the material of the respective melt stream ultimately seeks to get downstream via the path of least resistance. The configuration is also intended to minimize slow moving melt material near a "ceiling" of an inside annular channel (inside the respective shell) that could remain in the nozzle long enough to begin showing signs of degradation, which can then adversely affect a molded article receiving such melt. Thereafter, the downstream flow of skin or core material within inside annular channels 130e, 130b of the middle shell 114b/outer shell 116b, respectively, continues to cross through remaining downstream apertures 170 thereof and into respective grooves 172, as the flow moves into outside annular channels 130d, 130c of the middle shell 114b/outer shell 116b, respectively, to be swirled around the outside annular channels by the angled grooves 172 and thereby reduce incidence of increased shear heating.

In an embodiment, as represented in FIGS. 7A and 11, each groove 172 is at an angle $A_O$ of substantially 45 degrees±5 degrees from a longitudinal axis $L_A$ of the respective middle shell 114b and the outer shell 116b, and includes five apertures 170 along a length of the groove 172. Although five apertures 170 are shown, more or fewer apertures may be utilized in each groove depending upon the application. In another embodiment, each groove 172 is at an angle $A_O$ of substantially 45 degrees±10 degrees from the longitudinal axis $L_A$ of the respective middle shell 114b and the outer shell 116b. In another embodiment, each groove 172 is at an angle $A_O$ of substantially 20 or 30 degrees±10 degrees from the longitudinal axis $L_A$ of the respective middle shell 114b and the outer shell 116b. The plurality of apertures 170 are for directing a melt stream from an inside or interior to an outside or exterior of the respective middle shell 114b and outer shell 116b so that the melt stream will be directed into a respective groove 172 to flow within an annular channel, as described briefly above and in more detail further below. The plurality of apertures 170 and angled grooves 172 in the respective middle shell 114*b* and outer shell 116*b* balance or equalize shear heating peaks and valleys as the material is redistributed from an inside annular channel to its associated outside annular channel there though.

Figure 4:
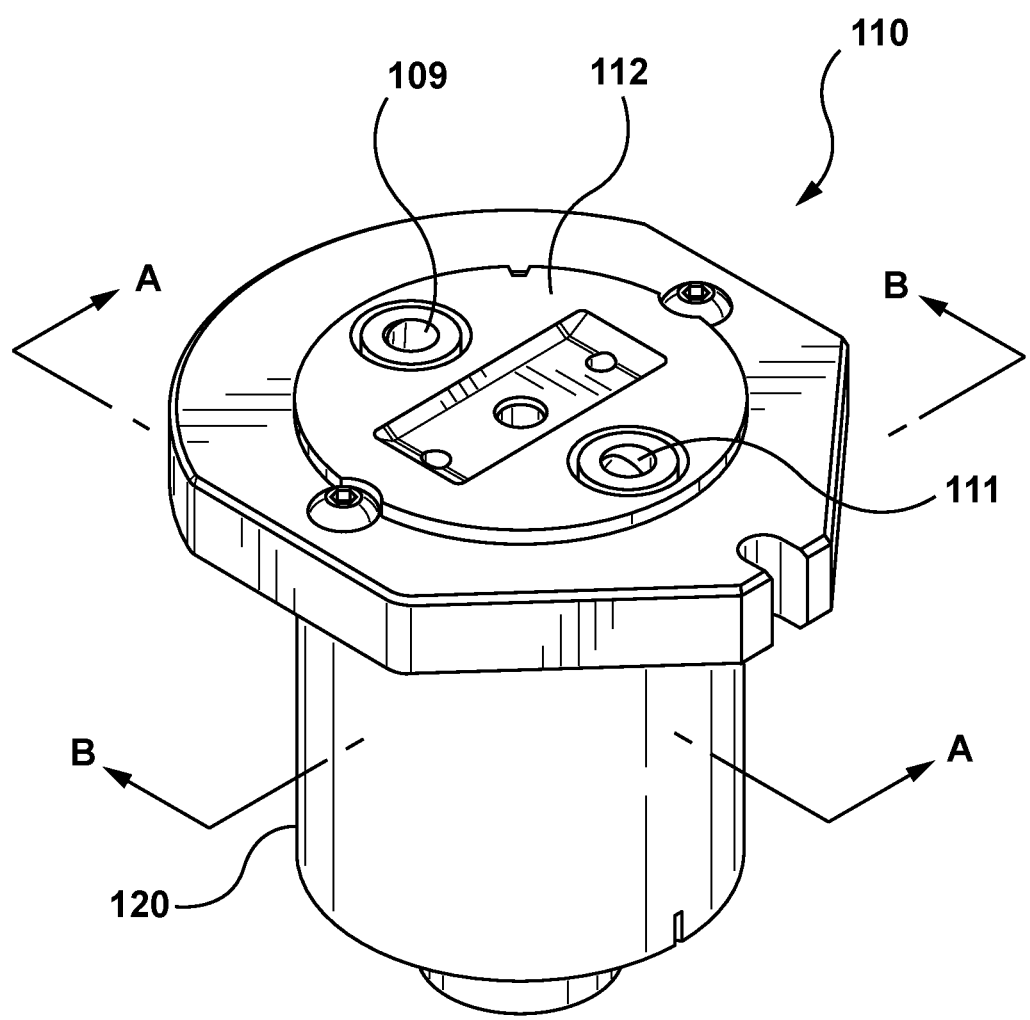
FIG. 4 depicts a perspective view of the co-injection nozzle of the previous figures in accordance with an embodiment hereof from an upstream end, with FIG. 4A being a sectional view taken along A-A of FIG. 4 and with FIG. 4B being a sectional view taken along B-B of FIG. 4.
Figure 4A:
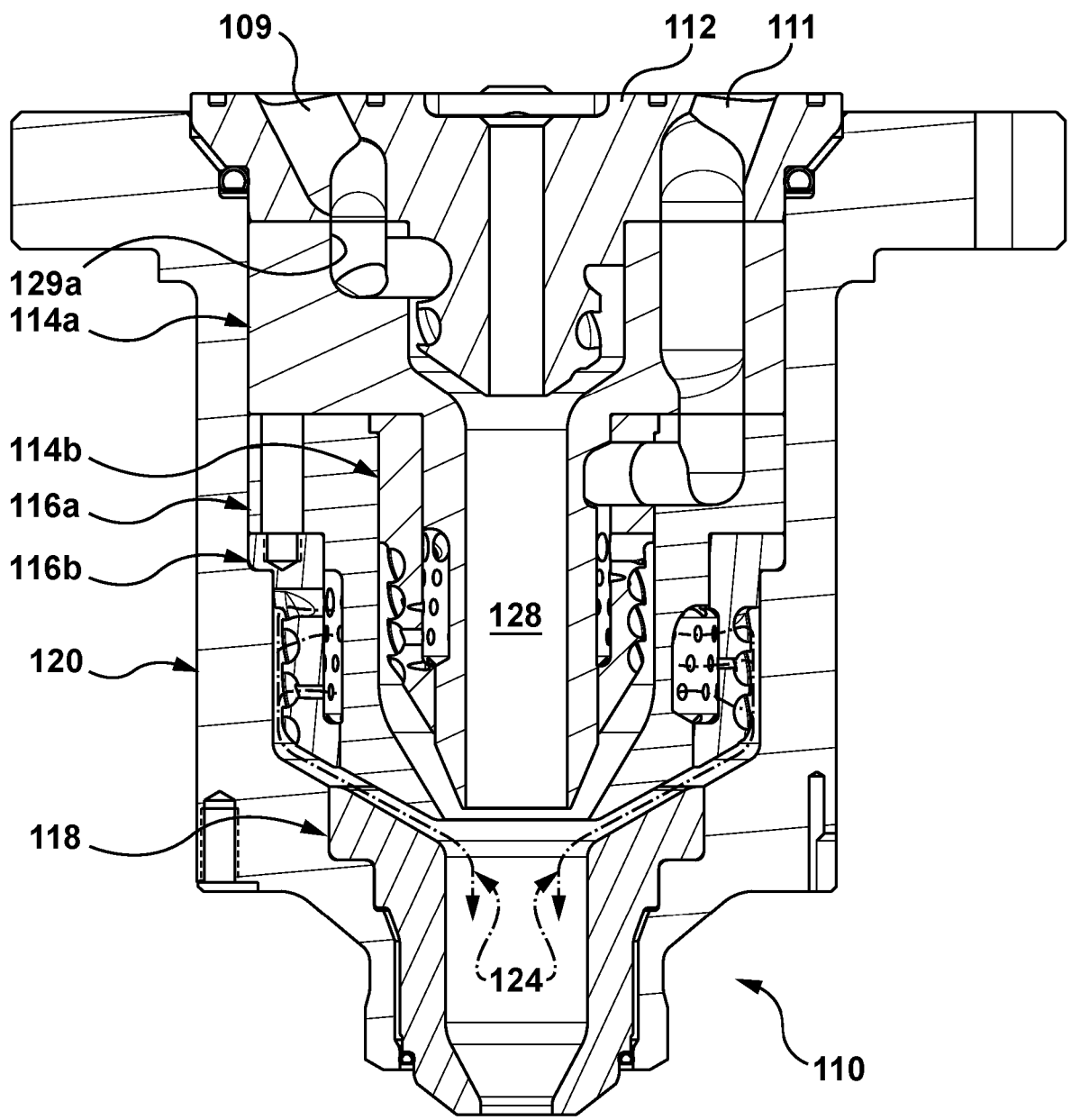
Figure 4B:
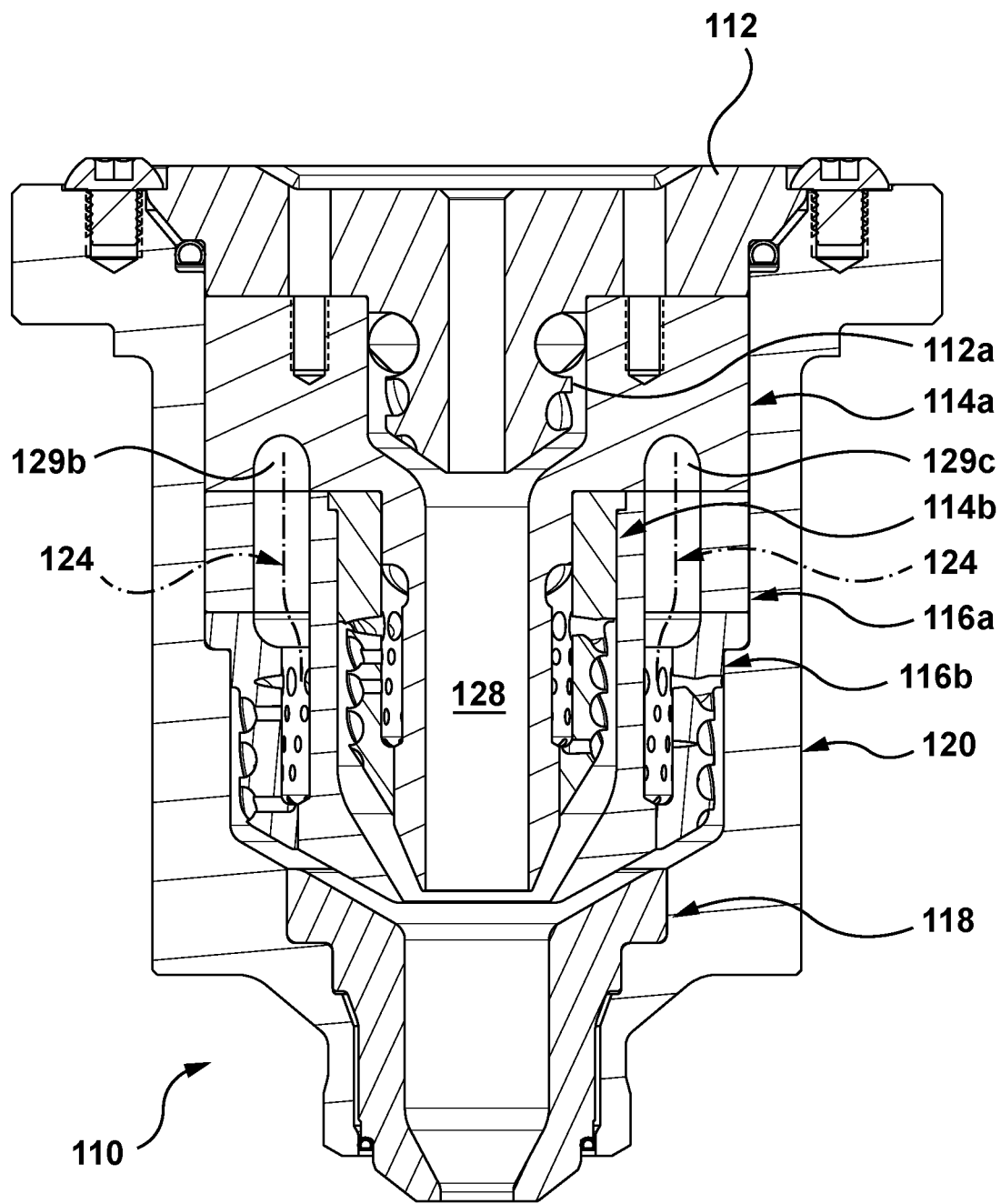

FIG. 4 depicts a perspective view of the co-injection nozzle 110 from an upstream end, with FIG. 4A being a sectional view taken along A-A of FIG. 4 and with FIG. 4B being a sectional view taken along B-B of FIG. 4. With reference to FIGS. 2A, 2B, 4, 4A and 4B, the valve pin support 112*a* of the inner means 112 is sized to fit within an upstream end of a central channel 128, which is defined within the upstream flange 113 of the middle sleeve 114*a*. The tubular extension 132 of the middle sleeve 114*a* extends within a central bore 133 defined through the middle shell 114*b*. The middle shell 114*b* fits within the central bore 134 defined through the outer sleeve 116*a*. The tubular extension 135 of the outer sleeve 116*a* extends within a bore or lumen 136 defined through outer shell 116*b*. In this manner, annular channels 130*a*, 130*b*, 130*c*, 130*d*, 130*e* are formed between various opposing surfaces of the nested inner part, middle component and outer component 112, 114, 116 of the combining component 108.

Figure 3A:
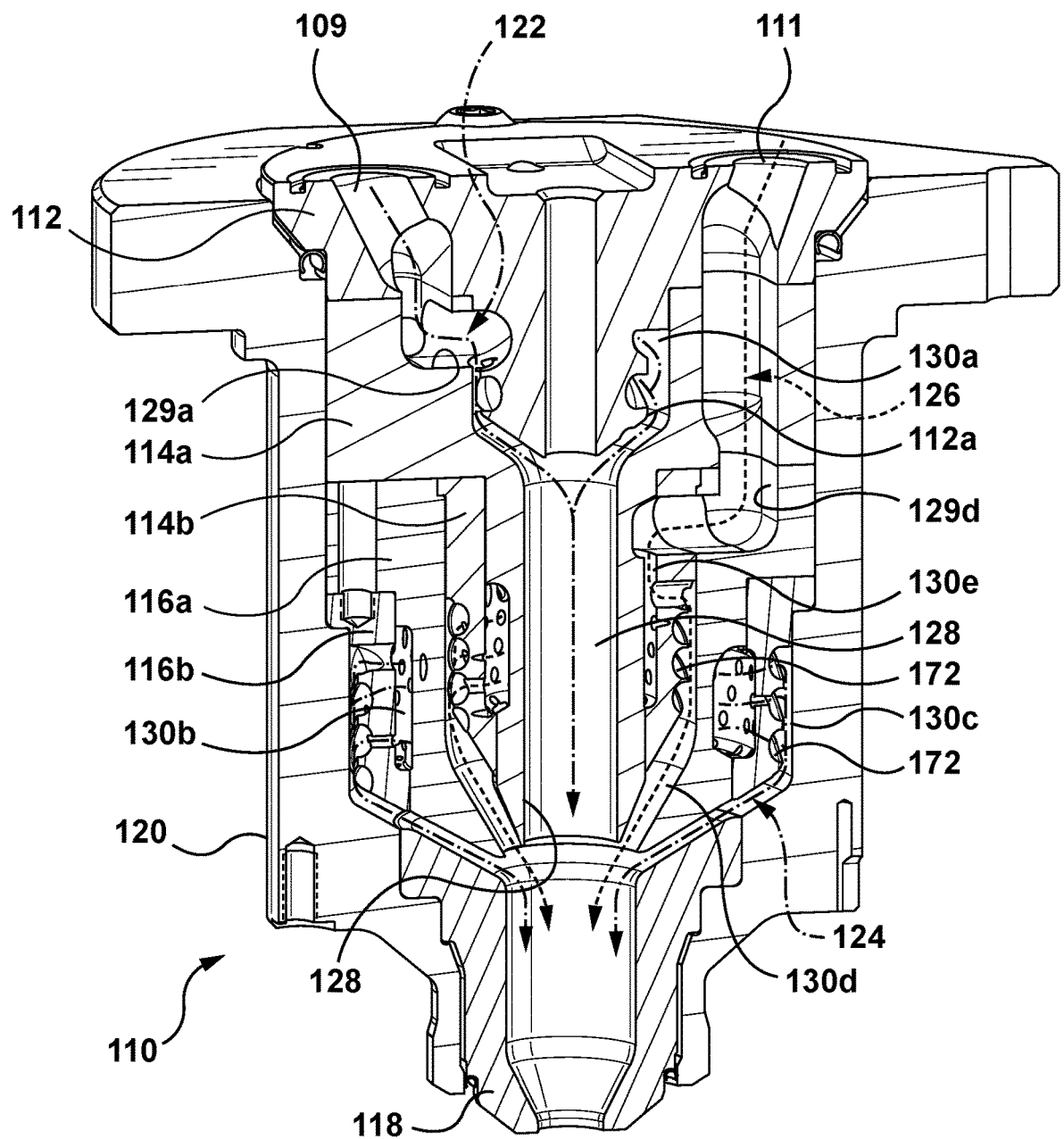
FIG. 3A depicts a skin material and a core material flowing through the co-injection nozzle of the previous figures in accordance with an embodiment hereof
Figure 3B:
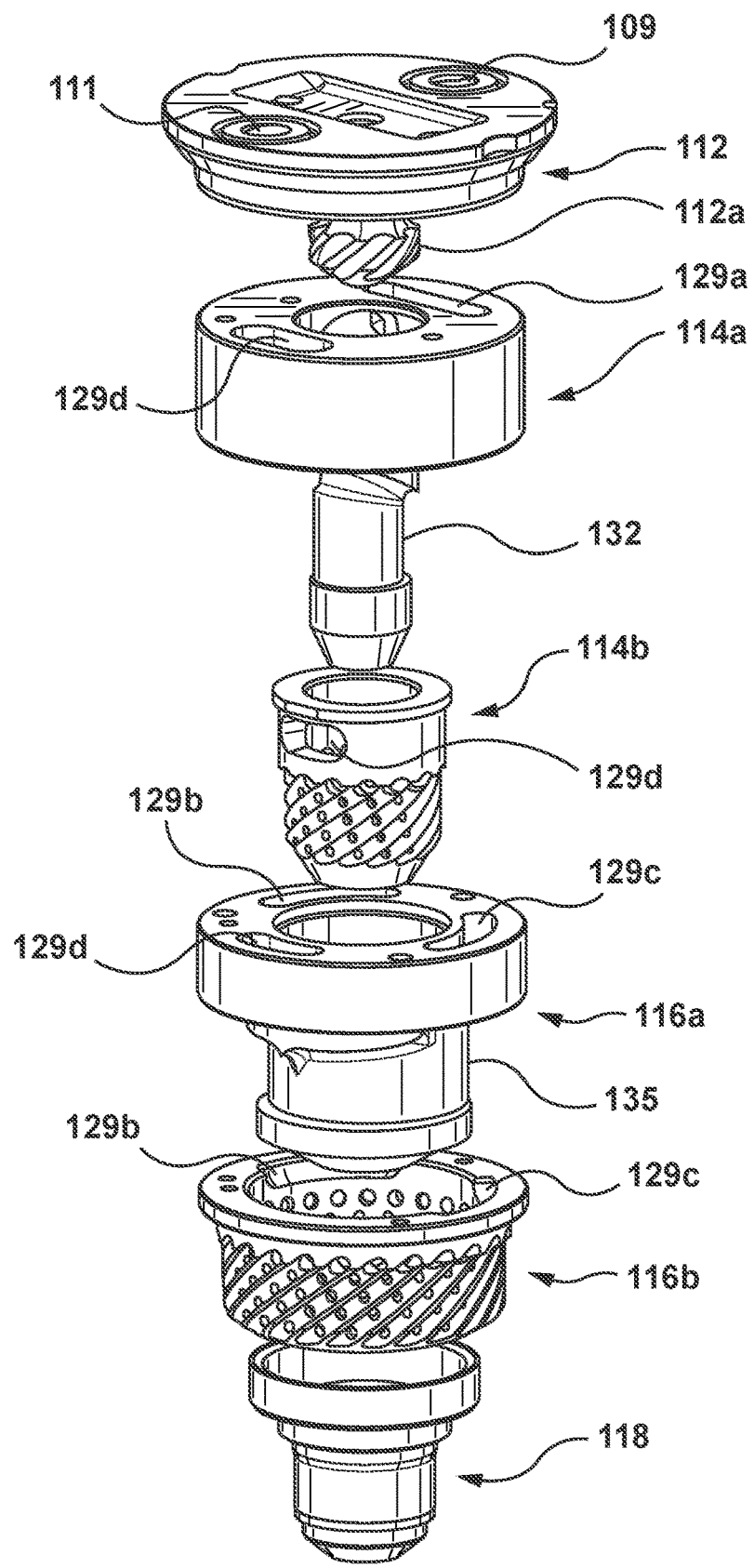
FIG. 3B depicts an exploded side view of the co-injection nozzle of the previous figures in accordance with an embodiment hereof.

The combining component 108 defines three melt stream flow paths 122, 124, 126 through the various components thereof in order to divide, direct and balance the first or skin material into inner and outer layers, and to direct and balance the second or core material into a middle or core layer between the inner and outer layers. The three melt stream flow paths 122, 124, 126 will be described with reference to FIGS. 3A and 3B that show the skin material in dashed-dotted lines (-.-) and the core material in dashed lines (---). The melt stream flow path 122 of the inner layer skin (-.-) material extends from the first inlet 109 to the central channel 128 defined by middle sleeve 114*a*, through a connector channel 129*a* of middle sleeve 114*a* and an annular channel 130*a* defined between the valve pin support 112*a* and an inner wall of the middle sleeve 114*a* such that the skin material melt stream swirls around the grooves 171 of the valve pin support 112*a* before entering the central channel 128.

The melt stream flow path 124 of the outer layer skin (-.-) material extends through the combining means 108 from the first inlet 109 to an annular channel 130*c* (outside annular channel 130*c* with respect to outer shell 116*b*) defined between an outer wall of the outer shell 116*b* and an inner wall of the nozzle body 120 (that defines a portion of the central bore 161 of the nozzle body 120). The melt stream flow path 124 of the outer layer skin (-.-) material flows through each of the connector channels 129*b*, 129*c* (formed through adjoining flanges of middle and outer sleeves 114*a*, 116*a* and outer shell 116*b*) and into an annular channel 130*b* (inside annular channel 130*b* with respect to the outer shell 116*b*) defined between an outer wall of the outer sleeve 116*a* and an inner wall of the outer shell 116*b*. More particularly, the melt stream flow path 124 of outer layer skin (-.-) material flows downstream from the annular channel 130*b* into the annular channel 130*c* through the plurality of apertures 170 in the sidewall of the outer shell 116*b*, such that the melt stream swirls around the series of angled grooves 172 formed in an outer surface of the outer shell 116*b* within the annular channel 130*c* to balance shear heating in the melt stream.

The melt stream flow path 126 of middle layer core (---) material extends from the second inlet 111 to an annular channel 130*d* (outside annular channel 130*d* with respect to middle shell 114*b*) defined between an outer wall of the middle shell 114*b* and an inner wall of the outer sleeve 116*a*. The melt stream flow path 126 of middle layer core (---) material flows through connector channels 129*d* (formed through adjoining flanges of middle and outer sleeves 114*a*, 116*a* and a sidewall of middle shell 114*b*) and an annular channel 130*e* (inside annular channel 130*e* with respect to the middle shell 114*b*) defined between an outer wall of middle sleeve 114*a* and an inner wall of the middle shell 114*b*. More particularly, the melt stream flow path 126 of the middle layer core (---) material flows from the annular channel 130*e* into the annular channel 130*d* through the plurality of apertures 170 in the sidewall of the middle shell 114*b*, such that the melt stream swirls into and around the series of angled grooves 172 formed in an outer surface of the middle shell 114*b* within the annular channel 130*d* to balance shear heating in the melt stream.

Figure 6:
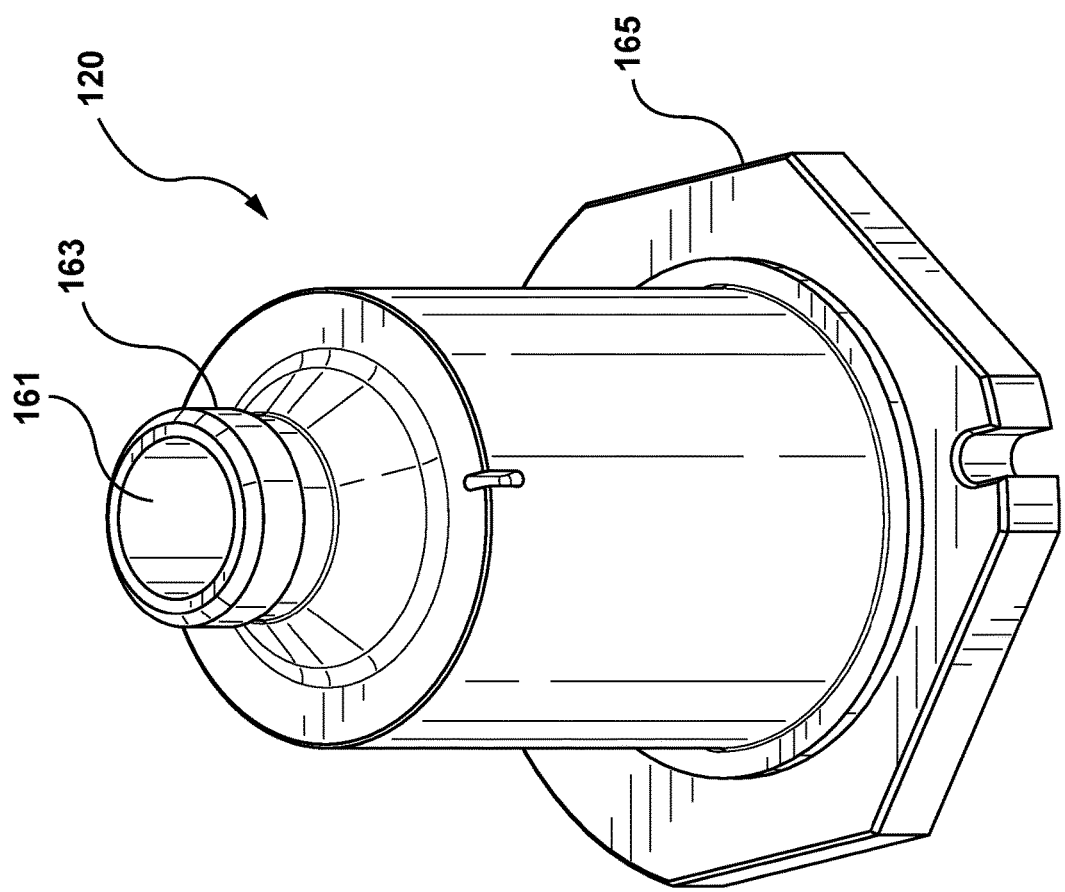
FIG. 6 is a perspective view of a downstream end of a nozzle body within which is disposed a combining means in accordance with an embodiment hereof.
Figure 9:
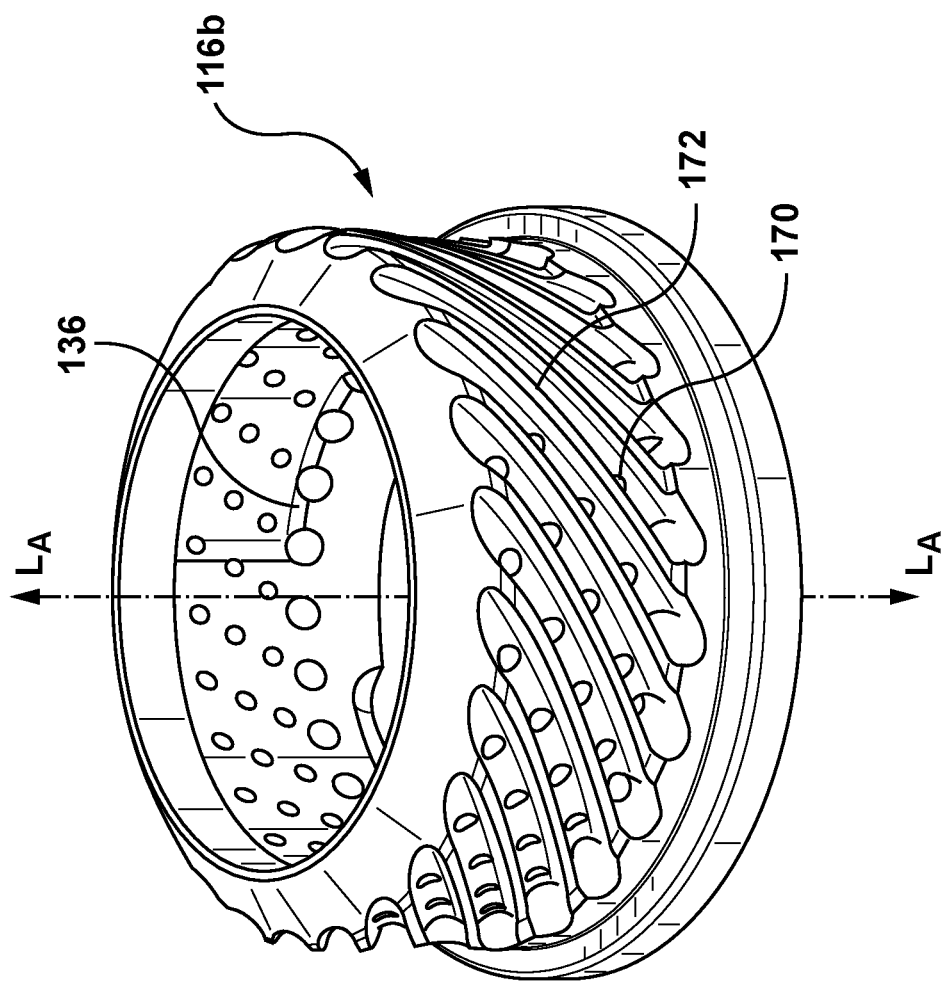
FIG. 9 is a perspective side view of an outer shell part of a combining means in accordance with an embodiment hereof.
Figure 13:
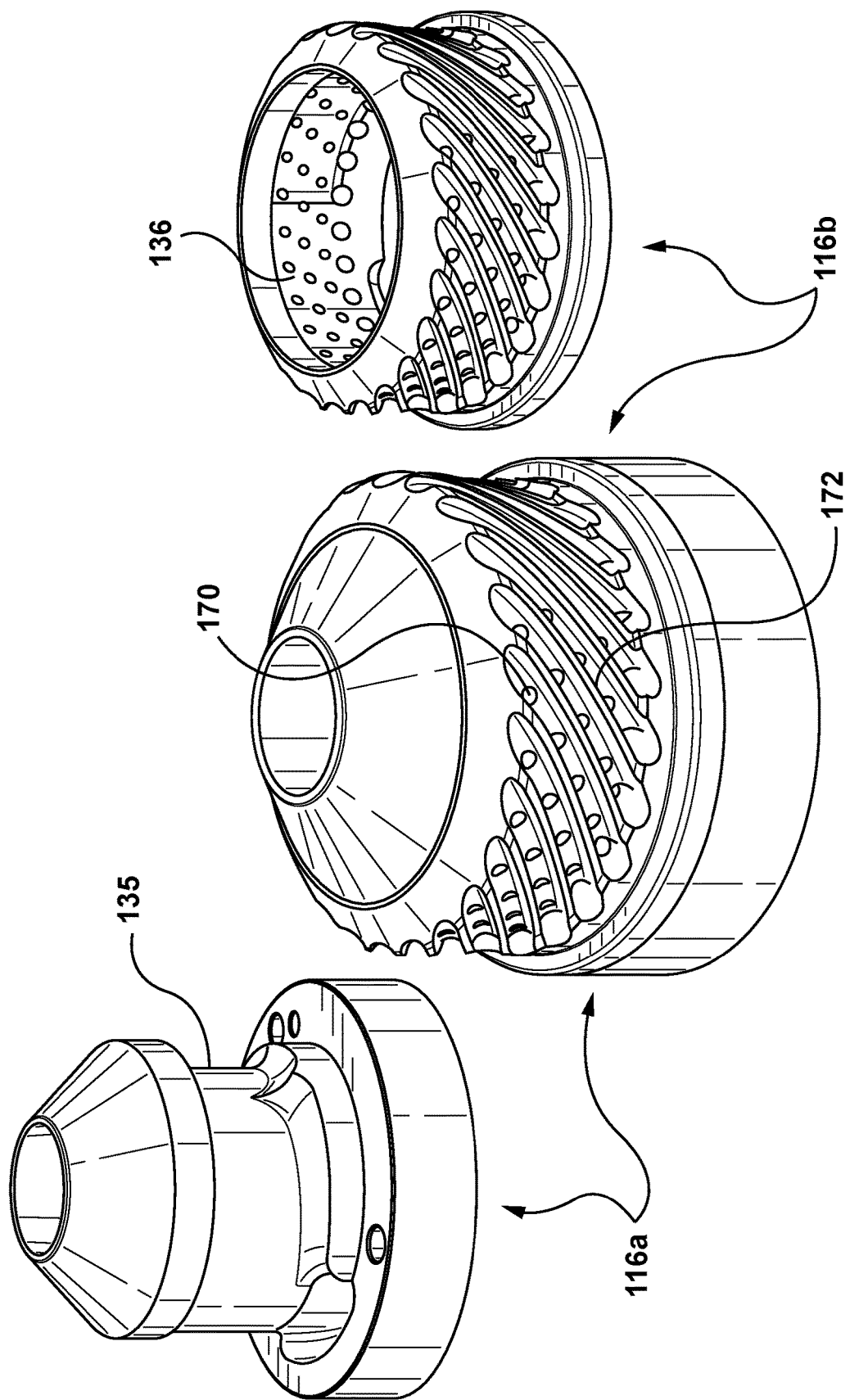
FIG. 13 depicts an outer sleeve part and an outer shell part separated and combined in accordance with an embodiment hereof.

FIG. 5 is a perspective view of a downstream end of the inner means 112 of a combining means in accordance with an embodiment hereof showing grooves 171 of the valve pin support 112*a*. FIG. 6 is a perspective view of a downstream end of the nozzle body 120, which is configured to receive a combining component 108 in accordance with an embodiment hereof. FIGS. 7A and 7B are a perspective side view and a perspective downstream end view, respectively, of the middle shell part 114*b* of the combining component 108 in accordance with an embodiment hereof. FIG. 8 depicts perspective side views of the middle sleeve part 114*a* of the combining component 108 in accordance with an embodiment hereof. FIG. 8A depicts a perspective side view of the middle sleeve part 114*a* and the middle shell part 114*b* combined in accordance with an embodiment hereof. FIG. 9 is a perspective side view of the outer shell part 116*b* of the combining component 108 in accordance with an embodiment hereof. FIG. 10 is a perspective view of an upstream end of the outer shell part 116*b* of the combining component 108 in accordance with an embodiment hereof. FIG. 11 is a perspective side view of the outer shell part 116*b* of the combining component 108 in accordance with an embodiment hereof. FIG. 12A is a perspective upstream end view and FIG. 12B is a perspective side view of the outer sleeve part 116*a* of the combining component 108 in accordance with an embodiment hereof. FIG. 13 depicts the outer sleeve part 116*a* and the outer shell part 116*b* separated and combined in accordance with an embodiment hereof.

Figure 14:
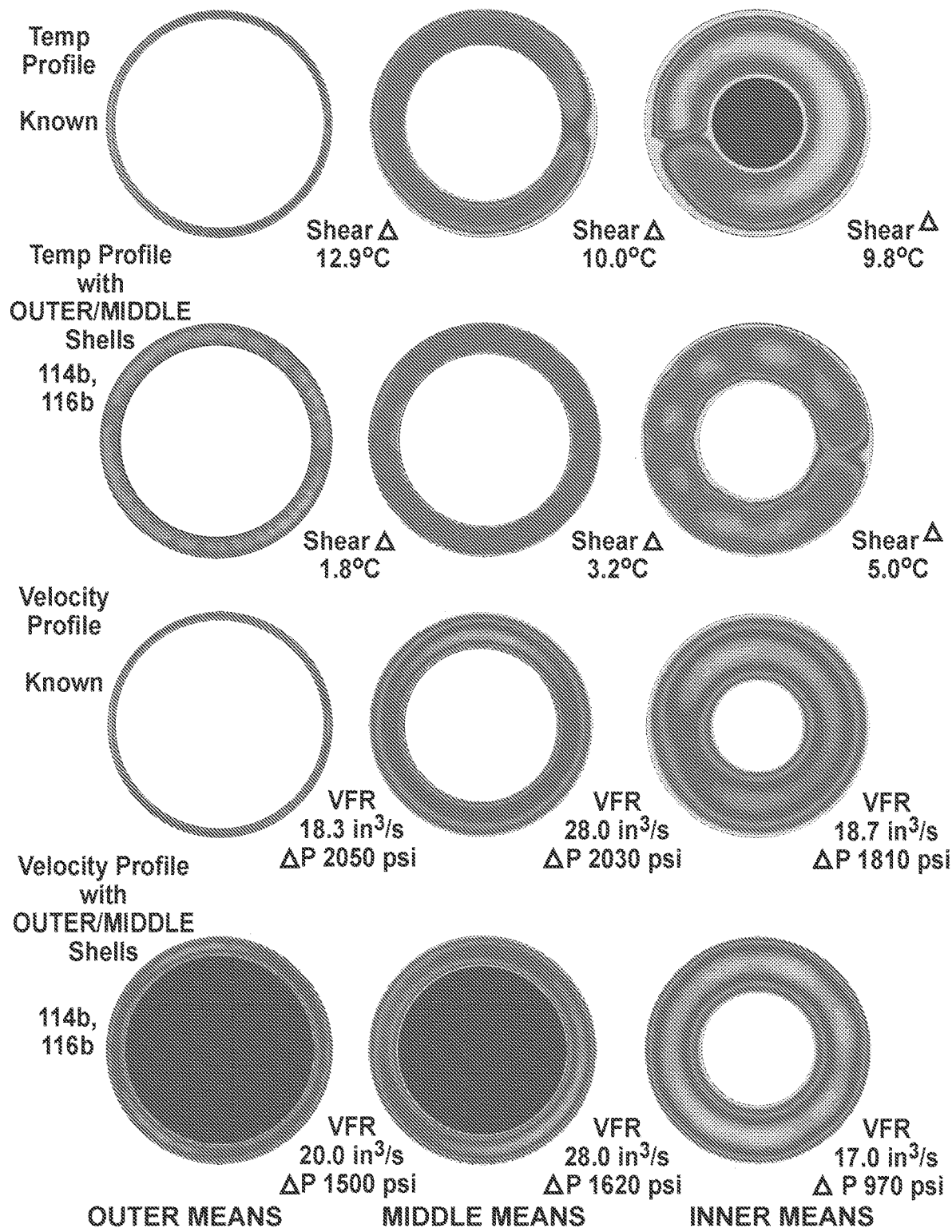
FIG. 14 depicts heat profiles for a combining means in accordance herewith in comparison to a known combining means without such components.

FIG. 14 depicts heat profiles for an outer means, a middle means and an inner means of a combining means utilizing an inner part, a middle shell part and an outer shell part in accordance herewith in comparison to a known combining means without such shell components. The benefit of embodiments of the invention, as represented in FIG. 14, is that temperature variations around the circumferences of the annular melt streams is significantly reduced, thereby creating a more consistent/uniform annular flow for each melt stream of material before they are combined with one another at the tip of the nozzle. By lowering the pressure drop at the creation of these annular flows (shown as "ΔP" in the lower half of the figure), embodiments of the invention also serve to reduce the overall amount of heat induced by shear in forming each annular flow. The "Shear Δ" number represents the magnitude of overall temperature variation around the circumference of the annular flow, centered between the inner and outer walls where the velocity/flowrate is highest. As can be seen in FIG. 14, the Shear Δ values are greatly reduced in embodiments hereof. The lower half of FIG. 14 depicts velocity profiles for each annular flow, and while the velocity profile may be considered as not as an important consideration as the temperature profile, the relevance of the data in FIG. 14 is that the reduction in pressure loss "ΔP", which as stated above correlates to a lower amount of energy lost in fluid friction, giving lower overall temperatures and pressure drops, is also very beneficial to the molding process. In summary, multiple benefits are gained via embodiments of the present invention, such that while reduced "Shear Δ" peaks are the primary goal of embodiments described herein, a reduction in overall temperatures and pressures of the melt streams flowing through the novel geometries is also realized and provides major added benefits.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A co-injection nozzle comprising:
    a combining component for balancing shear-induced heat in each of a first melt stream of moldable material and a second melt stream of moldable material that flow through the nozzle,
    the combining component having
        an inner part with a first port for receiving the first melt stream from a first melt source and a second port for receiving the second melt stream from a second melt source,
        a middle subcomponent that defines an inside annular channel between a middle sleeve and a middle shell thereof, and
        an outer subcomponent that defines an inside annular channel between an outer sleeve and an outer shell thereof,
    wherein the first melt stream is received within the inside annular channel of the middle subcomponent and flows downstream therefrom through a plurality of apertures in a sidewall of the middle shell and into a plurality of angled grooves in an outer surface of the sidewall of the middle shell, and
    wherein the second melt stream is received within the inside annular channel of the outer subcomponent and flows downstream therefrom through a plurality of apertures in a sidewall of the outer shell and into a plurality of angled grooves in an outer surface of the sidewall of the outer shell.

2. The co-injection nozzle of claim 1, wherein two or more apertures of the plurality of apertures of the middle shell and the outer shell, respectively, are disposed within a respective groove of the plurality of grooves of the middle shell and the outer shell, respectively.

3. The co-injection nozzle of claim 2, wherein an upstream aperture of the two or more apertures within the respective groove has a diameter that is greater than a diameter of a remainder of the two or more apertures within the respective groove.

4. The co-injection nozzle of claim 1, wherein each groove of the plurality of grooves of the middle shell and the outer shell, respectively, includes disposed therein two or more apertures of the plurality of apertures of the middle shell and the outer shell, respectively.

5. The co-injection nozzle of claim 4, wherein an upstream aperture of the two or more apertures within each groove has a diameter that is greater than a diameter of a remainder of the two or more apertures within each groove.

6. The co-injection nozzle of claim 1, wherein the inner part includes a valve pin support having an outer surface with a series of grooves formed therein, the valve pin support being sized to be received within a central bore of the middle sleeve.

7. The co-injection nozzle of claim 1, wherein a tubular extension of the middle sleeve is received within a central bore of the middle shell and wherein the inside annular channel of the middle subcomponent is formed between an outer surface of the tubular extension of the middle sleeve and the central bore of the middle shell.

8. The co-injection nozzle of claim 1, wherein a tubular extension of the outer sleeve is received within a central bore of the outer shell and wherein the inside annular channel of the outer subcomponent is formed between an outer surface of the tubular extension of the outer sleeve and the central bore of the outer shell.

9. The co-injection nozzle of claim 1, wherein the middle shell of the middle subcomponent is received within a central bore of the outer sleeve of the outer subcomponent and wherein an outside annular channel is formed between an outer surface of the middle shell and the central bore of the outer sleeve, the outside annular channel being in fluid communication with the inside annular channel of the middle subcomponent for receiving the first melt stream therefrom via the plurality of apertures and the plurality of angled grooves of the middle shell.

10. The co-injection nozzle of claim 1, further comprising:
    a nozzle body defining a central bore sized to receive the combining component and a nozzle tip,
    wherein the outer shell of the outer subcomponent is radially opposed to the central bore of the nozzle body and wherein an outside annular channel is formed between an outer surface of the outer shell and the central bore of the nozzle body, the outside annular channel being in fluid communication with the inside annular channel of the outer subcomponent for receiving the second melt stream therefrom via the plurality of apertures and the plurality of angled grooves of the outer shell.

11. A co-injection nozzle comprising:
    a combining component for balancing shear-induced heat in each of a first melt stream of moldable material and a second melt stream of moldable material that flow through the nozzle,
    the combining component having
        a first subcomponent that defines a first inside annular channel between a first sleeve and a first shell thereof, the first shell having a plurality of apertures in a sidewall thereof and a plurality of angled grooves in an outer surface of the sidewall thereof,
        a second subcomponent that defines a second inside annular channel between a second sleeve and a second shell thereof, the second shell having a plurality of apertures in a sidewall thereof and a plurality of angled grooves in an outer surface of the sidewall thereof, wherein the first melt stream is received within the first inside annular channel of the first subcomponent and flows downstream therefrom through the plurality of apertures and the plurality of angled grooves of the first shell, and wherein the second melt stream is received within the second inside annular channel of the second subcomponent and flows downstream therefrom through the plurality of apertures and the plurality of angled grooves of the second shell.

12. The co-injection nozzle of claim 11, wherein the first shell of the first subcomponent is received within a central bore of the second sleeve of the second subcomponent and wherein a first outside annular channel is formed between an outer surface of the first shell and the central bore of the second sleeve, the first outside annular channel being in fluid communication with the first inside annular channel of the first subcomponent for receiving the first melt stream therefrom via the plurality of apertures and the plurality of angled grooves of the first shell.

13. The co-injection nozzle of claim 12, further comprising:

a nozzle body defining a central bore sized to receive the combining component and a nozzle tip, wherein the second shell of the second subcomponent is radially opposed to the central bore of the nozzle body and wherein a second outside annular channel is formed between an outer surface of the second shell and the central bore of the nozzle body, the second outside annular channel being in fluid communication with the second inside annular channel of the second subcomponent for receiving the second melt stream therefrom via the plurality of apertures and the plurality of angled grooves of the second shell.

14. The co-injection nozzle of claim 11, wherein each groove of the plurality of grooves of the first shell and the second shell, respectively, includes disposed therein two or more apertures of the plurality of apertures of the first shell and the second shell, respectively.

15. The co-injection nozzle of claim 14, wherein an upstream aperture of the two or more apertures within each groove has a diameter that is greater than a diameter of a remainder of the two or more apertures within each groove.

16. The co-injection nozzle of claim 11, wherein the combining component further includes an inner part with a first port for receiving the first melt stream from a first melt source and a second port for receiving the second melt stream from a second melt source.

17. The co-injection nozzle of claim 16, wherein the inner part includes a valve pin support having an outer surface with a series of grooves formed therein, the valve pin support being sized to be received within a central bore of the first sleeve of the first subcomponent.

18. The co-injection nozzle of claim 11, wherein a tubular extension of the first sleeve is received within a central bore of the first shell and wherein the first inside annular channel of the first subcomponent is formed between an outer surface of the tubular extension of the first sleeve and the central bore of the first shell.

19. The co-injection nozzle of claim 18, wherein a tubular extension of the second sleeve is received within a central bore of the second shell and wherein the second inside annular channel of the second subcomponent is formed between an outer surface of the tubular extension of the second sleeve and the central bore of the second shell.

20. The co-injection nozzle of claim 11, wherein two or more apertures of the plurality of apertures of the first shell and the second shell, respectively, are disposed within a respective groove of the plurality of grooves of the first shell and the second shell, respectively.

* * * * *